US012772296B2

(12) United States Patent
Yin et al.

(10) Patent No.: US 12,772,296 B2
(45) Date of Patent: Oct. 20, 2026

(54) RANDOM ACCESS RESPONSE FOR NARROWBAND PHYSICAL RANDOM ACCESS CHANNEL PREAMBLES WITH ORTHOGONAL COVER CODE MULTIPLEXING

(71) Applicant: Sharp Kabushiki Kaisha, Sakai City (JP)

(72) Inventors: Zhanping Yin, Vancouver, WA (US); Tomoki Yoshimura, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 202 days.

(21) Appl. No.: 18/627,066

(22) Filed: Apr. 4, 2024

(65) Prior Publication Data

US 2025/0317974 A1 Oct. 9, 2025

(51) Int. Cl.
*H04W 74/0833* (2024.01)

(52) U.S. Cl.
CPC ................................ *H04W 74/0833* (2013.01)

(58) Field of Classification Search
CPC ................................................. H04W 74/0833
See application file for complete search history.

(56) References Cited

U.S. PATENT DOCUMENTS

2019/0174474 A1* 6/2019 Zhang ................... H04W 72/30
2019/0373587 A1* 12/2019 Chang ..................... H04L 67/12
2020/0260497 A1* 8/2020 Ozturk .................. H04L 12/413
2020/0396687 A1* 12/2020 Hwang ............... H04W 68/025
2021/0314117 A1* 10/2021 Wang .................... H04L 5/0053
2022/0377808 A1* 11/2022 Park ...................... H04W 72/23
2024/0407006 A1* 12/2024 Shah ......................... H04L 1/08
2025/0175289 A1* 5/2025 Sengupta .............. H04L 5/0012
2025/0317974 A1* 10/2025 Yin .................. H04W 74/0833

FOREIGN PATENT DOCUMENTS

JP 2021516025 A 6/2021

OTHER PUBLICATIONS

Deutsche Telekom (moderator, RAN VC), "New WID: Non-Terrestrial Networks (NTN) for Internet of Things (IoT) Phase 3", 3GPP TSG RAN Meeting #102, RP-234077, Dec. 15, 2023.
Sharp, "IoT NTN uplink enhancement with NPRACH multiplexing", 3GPP TSG RAN WG1 #116, R1-2401061, Mar. 1, 2024.

* cited by examiner

*Primary Examiner* — Benjamin H Elliott, IV
(74) *Attorney, Agent, or Firm* — Austin Rapp

(57) ABSTRACT

An internet of things (IoT) non-terrestrial network (NTN) device user equipment (UE) is described. The UE includes receiving circuitry configured to receive narrowband physical random access channel (NPRACH) configurations including NPRACH resource configuration, repetition parameters, orthogonal cover code (OCC) multiplexing methods and OCC multiplexing factors. The receiving circuitry is also configured to receive a narrowband physical downlink control channel (NPDCCH) downlink control information (DCI) format N1 and cyclic redundancy check (CRC) scrambled by a random access-radio network temporary identifier (RA-RNTI) for random access response (RAR) in an RA response window. The receiving circuitry is also configured to determine an OCC index indicated in the NPDCCH or the RAR, and compare the determined OCC index with a selected OCC index. Transmitting circuitry is configured to select an NPRACH resource, randomly select an OCC index for an OCC multiplexing and transmit NPRACH preambles.

13 Claims, 24 Drawing Sheets

300

Random access preamble parameters for frame structure type 1

| Preamble format | $G$ | $P$ | $N$ | $T_{CP}$ | $T_{SEQ}$ |
|---|---|---|---|---|---|
| 0 | 4 | 4 | 5 | $2048T_s$ | $5 \cdot 8192\ T_s$ |
| 1 | 4 | 4 | 5 | $8192T_s$ | $5 \cdot 8192\ T_s$ |
| 2 | 6 | 6 | 3 | $24576T_s$ | $3 \cdot 24576\ T_s$ |

400

Random access preamble parameters for frame structure type 2

| Preamble format | Supported uplink-downlink configurations | $G$ | $P$ | $N$ | $T_{CP}$ | $T_{SEQ}$ |
|---|---|---|---|---|---|---|
| 0 | 1, 2, 3, 4, 5 | 2 | 4 | 1 | $4768T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

FIG. 4

500

Random access baseband parameters

| Preamble format | $\Delta f_{RA}$ | |
|---|---|---|
| | Frame Structure Type 1 | Frame Structure Type 2 |
| 0, 1 | 3.75 kHz | |
| 0-a, 1-a | | 3.75 kHz |
| 2 | 1.25 kHz | 3.75 kHz |

FIG. 5

900

Subframes between preamble transmission and RA Response Window in NB-IoT

| TDD/FDD mode | Preamble format | Number of NPRACH repetitions | X |
|---|---|---|---|
| FDD | 0 or 1 | >= 64 | 41 |
| FDD | 0 or 1 | < 64 | 4 |
| FDD | 2 | >= 16 | 41 |
| FDD | 2 | < 16 | 4 |
| TDD | Any | Any | 4 |

FIG. 9

1000

< NPDCCH order = 0, N1 CRC masked with RA-RNTI >

| Field | # of Bits | Description |
|---|---|---|
| Flag for format N0/format N1 differentiation | 1 | 0 – N0, 1 – N1 |
| NPDCCH order indicator | 1 | |
| Scheduling delay | 3 | |
| Resource assignment | 3 | |
| Modulation and coding scheme | 4 | |
| Repetition number | 4 | |
| Reserved | 1 | |
| Reserved | 4 | |
| DCI subframe repetition number | 2 | |
| Total Number of Bits | 23 | |

FIG. 10

1200

MCS index for Msg3 NPUSCH

| **MCS Index** $I_{MCS}$ | **Modulation** $\Delta f$ = 3.75 kHz **or** $\Delta f$ = 15 kHz **and** $I_{sc}$ = 0, 1, …, 11 | **Modulation** $\Delta f$ = 15 kHz **and** $I_{sc}$ > 11 | **Number of RUs** $N_{RU}$ | **TBS** |
|---|---|---|---|---|
| '000' | pi/2 BPSK | QPSK | 4 | 88 bits |
| '001' | pi/4 QPSK | QPSK | 3 | 88 bits |
| '010' | pi/4 QPSK | QPSK | 1 | 88 bits |
| '011' | reserved | reserved | reserved | reserved |
| '100' | reserved | reserved | reserved | reserved |
| '101' | reserved | reserved | reserved | reserved |
| '110' | reserved | reserved | reserved | reserved |
| '111' | reserved | reserved | reserved | reserved |

FIG. 12

1300

EDT TBS for Msg3 NPUSCH with *edt-SmallTBS-Enabled* set to 'true'

| ***edt-TBS*** | ***edt-SmallTBS-Subset*** | **Allowable TBS values** |
|---|---|---|
| 408 | not configured | 328, 408 |
| 504 | not configured | 328, 408, 504 |
| 504 | enabled | 408, 504 |
| 584 | not configured | 328, 408, 504, 584 |
| 584 | enabled | 408, 584 |
| 680 | not configured | 328, 456, 584, 680 |
| 680 | enabled | 456, 680 |
| 808 | not configured | 328, 504, 680, 808 |
| 808 | enabled | 504, 808 |
| 936 | not configured | 328, 504, 712, 936 |
| 936 | enabled | 504, 936 |
| 1000 | not configured | 328, 536, 776, 1000 |
| 1000 | enabled | 536, 1000 |

FIG. 13

1400

MCS index for Msg3 NPUSCH and EDT

| **MCS Index** $I_{MCS}$ | **Number of Rus** $N_{RU}$ | | |
|---|---|---|---|
| | ***edt-TBS* = 328, 408, 504, or 584** | ***edt-TBS* = 680** | ***edt-TBS* = 808, 936, or 1000** |
| '011' | 3 | 3 | 4 |
| '100' | 4 | 4 | 5 |
| '101' | 5 | 5 | 6 |
| '110' | 6 | 8 | 8 |
| '111' | 8 | 10 | 10 |

FIG. 14

1500

Allocated subcarriers for NPUSCH with $\Delta f$ = 15kHz

| **Subcarrier indication field** ($I_{sc}$) | **Set of Allocated subcarriers** ($n_{sc}$) |
|---|---|
| 0 - 11 | $I_{sc}$ |
| 12 - 15 | $3(I_{sc} - 12) + \{0, 1, 2\}$ |
| 16 - 17 | $6(I_{sc} - 16) + \{0, 1, 2, 3, 4, 5\}$ |
| 18 | {0, 1, 2, 3, 4, 5, 6, 7, 8, 9, 10, 11} |
| 19 - 63 | Reserved |

FIG. 15

1600

Number of resource units ($N_{RU}$) for NPUSCH

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

FIG. 16

1700

Number of repetitions ($N_{Rep}$) for NPUSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

FIG. 17

1800

| Subcarrier indication field ($I_{sc}$) | Set of Allocated subcarriers ($n_{sc}$) |
|---|---|
| 0 - 11 | $I_{sc}$ |
| 12 - 15 | $3(I_{sc} - 12) + \{0, 1, 2\}$ |
| 16 - 17 | $6(I_{sc} - 16) + \{0, 1, 2, 3, 4, 5\}$ |
| 18 | {0, 1, 2, 3, 4, 5, 6, 7, 8, 9, 10, 11} |
| 19 - 63 | Reserved |

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

FIG. 18

| NPUSCH format | $\Delta f$ | $N_{sc}^{RU}$ | $N_{slots}^{UL}$ | $N_{symb}^{UL}$ |
|---|---|---|---|---|
| | 3.75 kHz | 1 | 16 | |
| | | 1 | 16 | |
| 1 | 15 kHz | 3 | 8 | 7 |
| | | 6 | 4 | |
| | | 12 | 2 | |
| 2 | 3.75 kHz | 1 | 4 | |
| | 15 kHz | 1 | 4 | |

RANDOM ACCESS RESPONSE FOR NARROWBAND PHYSICAL RANDOM ACCESS CHANNEL PREAMBLES WITH ORTHOGONAL COVER CODE MULTIPLEXING

TECHNICAL FIELD

The present disclosure relates generally to communication systems. More specifically, the present disclosure relates to methods of random access response for Narrowband Physical Random Access Channel (NPRACH) preambles with orthogonal cover code multiplexing.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 4 is a table illustrating another example of random access preamble parameters for a frame structure;

FIG. 5 is a table illustrating an example of random access baseband parameters;

FIG. 9 is a table showing an example of subframes between a preamble transmission and Random Access (RA) Response Window in NB-IoT;

FIG. 10 is a table showing an example of a control message format used in NB-IoT relating to the NPDCCH;

FIG. 12 is a table showing an example of an MCS index for Msg3 NPUSCH;

FIG. 13 is a table showing an example of configuration parameters for the transmission of Msg3 on NPUSCH with a focus on eDT-TBS (enhanced Data Transmission—Transport Block Size) values;

FIG. 14 is a table showing an example of an MCS index for Msg3 NPUSCH and EDT;

FIG. 15 is a table showing an example of allocated subcarriers for NPUSCH with Δf=15 kHz;

FIG. 16 is a table showing an example of a number of resource units (NRU) for NPUSCH;

FIG. 17 is a table showing an example of a number of repetitions (NRep) for NPUSCH;

FIG. 18 is a diagram showing examples of tables of subcarrier indication field mappings to sets of allocated subcarriers and of NPUSCH format configurations;

DETAILED DESCRIPTION

Figure 1:
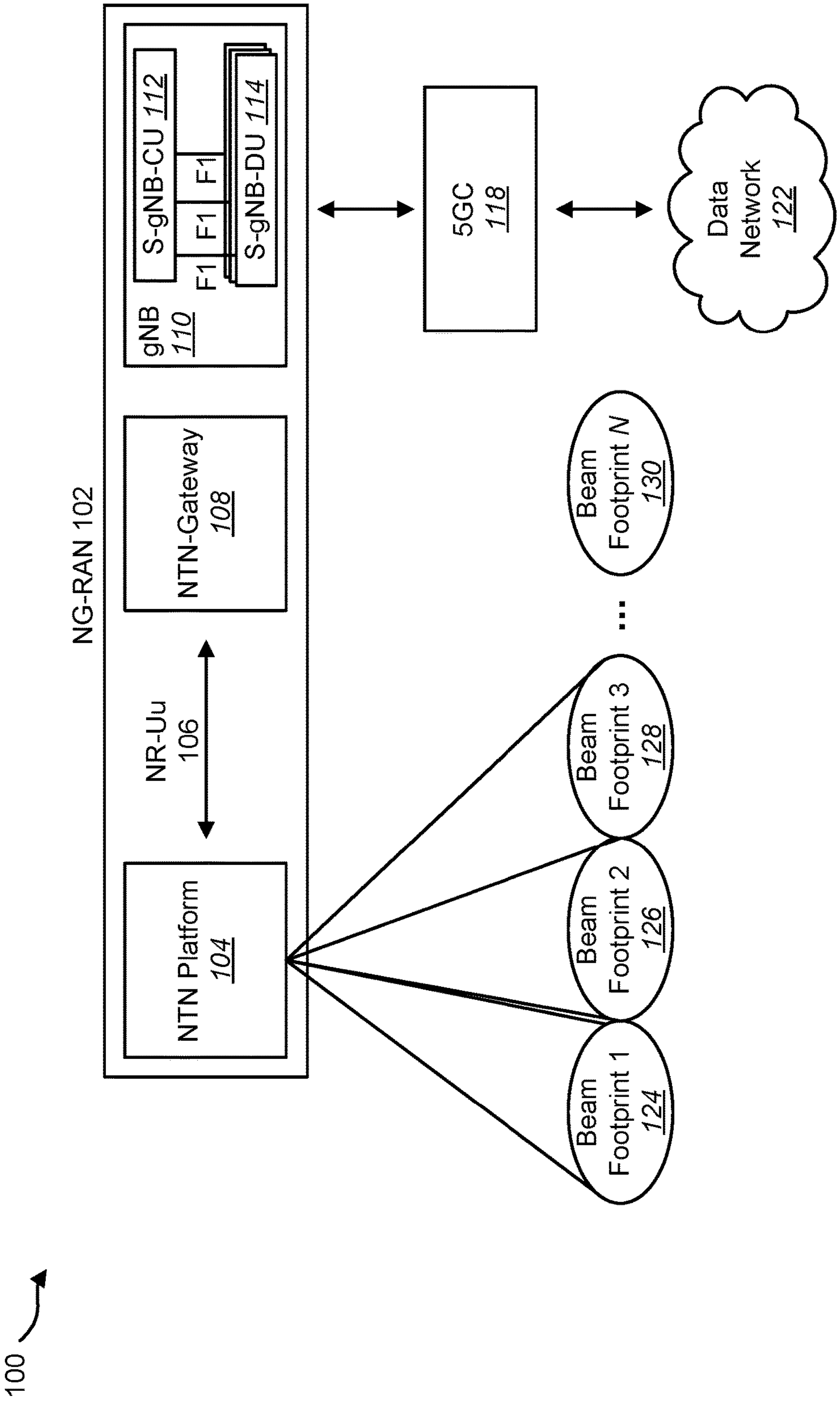
FIG. 1 is a diagram illustrating an example of a non-terrestrial network (NTN) coverage area.

An internet of things (IoT) non-terrestrial network (NTN) device user equipment (UE) is described. The UE includes receiving circuitry configured to receive narrowband physical random access channel (NPRACH) configurations including NPRACH resource configuration, repetition parameters, orthogonal cover code (OCC) multiplexing methods and OCC multiplexing factors. The receiving circuitry may also be configured to receive a narrowband physical downlink control channel (NPDCCH) downlink control information (DCI) format N1 and cyclic redundancy check (CRC) scrambled by a random access-radio network temporary identifier (RA-RNTI) for random access response (RAR) in an RA response window after transmission of NPRACH preambles with the configured OCC multiplexing. The receiving circuitry may also be configured to determine an OCC index indicated in the NPDCCH or the RAR, and compare the determined OCC index with a selected OCC index in the NPRACH preamble transmissions with OCC multiplexing. The UE also includes transmitting circuitry configured to select an NPRACH resource, randomly select an OCC index for an OCC multiplexing. The transmitting circuitry may also be configured to transmit NPRACH preambles with a configured OCC multiplexing method and a multiplexing factor.

The OCC index may be determined by one or more OCC index fields using reserved bits in NPDCCH DCI format N1 for RAR. In some examples, the OCC index may be determined by an RA-RNTI value based on a defined formula with offset values for the OCC indexes. The OCC index may be the same if the received NPDCCH is scrambled with the RA-RNTI derived by the selected OCC index in the NPRACH preamble transmissions with OCC multiplexing.

In another example, the OCC index may be determined by a scrambling sequence applied to the NPDCCH. In some examples, the OCC index may be indicated in medium access control (MAC) RAR content using reserved bits.

If the determined OCC index is the same as the selected OCC index in the NPRACH preamble transmissions with OCC multiplexing, the UE may receive the narrowband physical downlink shared channel (NPDSCH) for RAR as scheduled by the NPDCCH.

In a further example, if the determined OCC index is not the same as the selected OCC index in the NPRACH preamble transmissions with OCC multiplexing, the UE may not receive the narrowband physical downlink shared channel (NPDSCH) for RAR scheduled by the NPDCCH.

A base station (gNB) is described. The gNB may include transmitting circuitry configured to transmit narrowband physical random access channel (NPRACH) configurations including NPRACH resource configuration, repetition parameters, orthogonal cover code (OCC) multiplexing methods and OCC multiplexing factors. The transmitting circuitry may also be configured to transmit a narrowband physical downlink control channel (NPDCCH) downlink control information (DCI) format N1 with cyclic redundancy check (CRC) scrambled by a random access-radio network temporary identifier (RA-RNTI) for random access response (RAR) in an RA response window after reception of NPRACH preambles with OCC multiplexing. The transmitting circuitry may also be configured to transmit a narrowband physical downlink shared channel (NPDSCH) for RAR scheduled by the NPDCCH with DCI format N1 for RAR. The gNB also includes receiving circuitry configured to receive and detect NPRACH preambles on NPRACH resources with a configured OCC multiplexing method and a multiplexing factor. The receiving circuitry may also be configured to determine an NPRACH index and an OCC index for the received NPRACH preambles.

The determined OCC index may be indicated by one or more OCC index fields using reserved bits in NPDCCH DCI format N1 for RAR. In other examples, the OCC index may be indicated in medium access control (MAC) RAR content using reserved bits.

For the NPDCCH CRC scrambling, an RA-RNTI value may be calculated based on a defined formula with an offset value for the determined OCC index.

A scrambling sequence for the NPDCCH for RAR may be determined by the determined OCC index.

A method by an internet of things (IoT) non-terrestrial network (NTN) device user equipment (UE) is described. The method includes receiving narrowband physical random access channel (NPRACH) configurations including NPRACH resource configuration, repetition parameters, orthogonal cover code (OCC) multiplexing methods and OCC multiplexing factors. The method also includes receiving a narrowband physical downlink control channel (NPDCCH) downlink control information (DCI) format N1 and cyclic redundancy check (CRC) scrambled by a random access-radio network temporary identifier (RA-RNTI) for random access response (RAR) in an RA response window after transmission of NPRACH preambles with the configured OCC multiplexing. The method also includes determining an OCC index indicated in the NPDCCH or the RAR, and comparing the determined OCC index with a selected OCC index in the NPRACH preamble transmissions with OCC multiplexing. The method also includes selecting an NPRACH resource and randomly selecting an OCC index for an OCC multiplexing. The method also includes transmitting NPRACH preambles with a configured OCC multiplexing method and a multiplexing factor.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a wireless terminal, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a wireless terminal. However, as the scope of the present disclosure should not be limited to the 3GPP standards, the terms "wireless terminal" and "wireless communication device" may be used interchangeably herein to mean the more general term "wireless communication device." A wireless terminal may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a wireless terminal. It should also be noted that in E-UTRA and E-UTRAN overall description, as used herein, a "cell" may be defined as "combination of downlink and optionally uplink resources." The linking between the carrier frequency of the downlink (DL) resources and the carrier frequency of the uplink resources may be indicated in the system information transmitted on the downlink resources.

"Configured cells" are those cells of which the wireless terminal is aware and is allowed by an eNB to transmit or receive information. "Configured cell(s)" may be serving cell(s). The wireless terminal may receive system information and perform the required measurements on all configured cells. "Configured cell(s)" for a radio connection may include a primary cell and/or no, one, or more secondary cell(s). "Activated cells" are those configured cells on which the wireless terminal is transmitting and receiving. That is, activated cells are those cells for which the wireless terminal monitors the physical downlink control channel (PDCCH) and in the case of a downlink transmission, those cells for which the wireless terminal decodes a physical downlink shared channel (PDSCH). "Deactivated cells" are those configured cells that the wireless terminal is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IoT)) but lower than URLLC and eMBB.

A non-terrestrial network (NTN) refers to a network, or segment of networks using radio frequency (RF) resources onboard a satellite (or UAS platform). Non-Terrestrial Network typically features the following elements: one or several sat-gateways that connect the Non-Terrestrial Network to a public data network. For example, a Geostationary Earth Orbiting (GEO) satellite is fed by one or several sat-gateways which are deployed across the satellite targeted coverage (e.g., regional or even continental coverage). It may be assumed that wireless terminals in a cell are served by only one sat-gateway. A Non-GEO satellite served successively by one or several sat-gateways at a time. The system ensures service and feeder link continuity between the successive serving sat-gateways with sufficient time duration to proceed with mobility anchoring and hand-over.

Additionally, Non-Terrestrial Network typically features the following elements: a Feeder link or radio link between a sat-gateway and the satellite (or Unmanned Aircraft System (UAS) platform), a service link or radio link between the wireless terminal and the satellite (or UAS platform).

Additionally, Non-Terrestrial Network typically features the following elements: a satellite (or UAS platform) which may implement either a transparent or a regenerative (with onboard processing) payload. The satellite (or Unmanned Aircraft System (UAS) platform) may generate several beams over a given service area bounded by its field of view. The footprints of the beams are typically of elliptic shape. The field of view of a satellite (or UAS platform) depends on the onboard antenna diagram and min elevation angle. For a transparent payload, radio frequency filtering, frequency conversion and amplification may be applied. Hence, the waveform signal repeated by the payload is un-changed. For a regenerative payload, radio frequency filtering, frequency conversion and amplification as well as demodulation/decoding, switch and/or routing, coding/modulation may be applied. This is effectively equivalent to having all or part of base station functions (e.g., gNB) onboard the satellite (or UAS platform).

Additionally, Non-Terrestrial Network may optionally feature the following elements: Inter-satellite links (ISL) optionally in case of a constellation of satellites. This will require regenerative payloads onboard the satellites. ISL may operate in RF frequency or optical bands.

Additionally, Non-Terrestrial Network typically features the following elements: User Equipment may be served by the satellite (or UAS platform) within the targeted service area.

There may be different types of satellites (or UAS platforms): Low-Earth Orbit (LEO) satellite, Medium-Earth Orbit (MEO) satellite, Geostationary Earth Orbit (GEO) satellite, UAS platform (including High-Altitude Platform Station (HAPS) and High Elliptical Orbit (HEO) satellite). Detailed descriptions are shown in Table 1.

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Typically, GEO satellites and UAS are used to provide continental, regional or local service. A constellation of LEO and MEO may be used to provide services in both Northern and Southern hemispheres. In some cases, the constellation can even provide global coverage including polar regions. For the later, this requires appropriate orbit inclination, sufficient beams generated and inter-satellite links.

Non-terrestrial networks may provide access to wireless terminal in six reference scenarios including: Circular orbiting and notional station keeping platforms, highest round trip delay (RTD) constraint, highest Doppler constraint, a transparent and a regenerative payload, one ISL case and one without ISL (Regenerative payload is mandatory in the case of inter-satellite links), fixed or steerable beams resulting respectively in moving or fixed beam foot print on the ground.

The systems and methods described herein may be used to address the need of NTN Internet of Things (IoT) NPRACH multiplexing with an Orthogonal Cover Code (OCC):

- The NTN link may be long distance, and the signal may be weak, thus, more repetitions may be needed for an NPRACH preamble transmission.
- The NTN may have a very large coverage area, and the number of IoT devices in the coverage area may be very large.
- Collision of NPRACH preambles between NTN IoT device may occur more frequently.

After receiving the NPRACH preamble, the gNB may send a Random Access Response (RAR) to the UE. Currently, the RAR detection is done by the scrambling with the Random Access Radio Network Temporary Identifier (RA-RNTI). The RA-RNTI value is determined by the NPRACH index (time/freq allocation). The eNB may receive multiple preambles in the same NPRACH time/freq resource.

In case of NPRACH with OCC multiplexing, the gNB can detect NPRACHs from different UEs with different OCC indexes even if they are using the same NPRACH time and frequency resource. Thus, some methods are required to indicate the OCC index of the NPRACH preamble transmission, so that the UEs can determine if the RAR is targeted to itself.

Alternatively, if the OCC index is not indicated in the RAR, some methods should be specified in the Msg 3 transmission for collision resolution of UEs that transmit different NPRACH OCC indexes and receive the same RAR.

Nprach Preamble Transmissions with Orthogonal Cover Code Multiplexing in IoT NTN IoT NTN User Equipment (UE) uses legacy methods for NPRACH resource selection, preamble format determination and sequence generation, etc. If the OCC is configured, the UE will pick an OCC index randomly in the set of OCC codes, and apply to the Physical Random Access Channel (PRACH) preamble sequences by multiplication.

The base station configures the OCC multiplexing method and the OCC multiplexing factor in NPRACH configurations for Narrowband Internet of Things (NB-IoT). The base station detects the NPRACH sequences by hypothesis tests with all OCC codes, and finds whether one or more NPRACH preamble(s) is(are) received. The base station determines the NPRACH index(s) and the OCC index(s) if NPRACH preamble(s) is(are) detected.

Several OCC multiplexing methods may be considered.

Method 1: Intra Repetition OCC Multiplexing Only, Type 1 OCC

OCC is applied among the random access symbol groups in a repetition, also known as inner OCC, inner multiplexing, intra-NPRACH-multiplexing, and intra-Repetition-multiplexing, etc.

The total number of symbol groups in a preamble repetition unit is denoted by P. The multiplexing capability of intra repetition multiplexing is determined by the value P, e.g. the maximum spreading factor of 4 OCC for the 4 access symbol groups in a repetition for preamble format 0 and format 1.

Method 2: Inter Repetition OCC Multiplexing Only, Type 2 OCC

OCC is applied among the NPRACH preamble repetitions. This method can be named as outer-OCC, outer-multiplexing, inter-Repetition-OCC, and inter-Repetition-multiplexing, etc.

The OCC code is applied on each preamble repetition. The inter repetition OCC multiplexing factor can be configured, e.g. 2, 4, 8, 16, and 32, etc. The inter repetition OCC multiplexing factor is not higher than the configured number of repetitions numRepetitionsPerPreambleAttempt. A larger number of multiplexing factors may be configured for larger repetition factors to reduce the collision probability.

Method 3: OCC Multiplexing on Symbol Groups within and Across Repetitions, Type 3 OCC OCC is applied among the random access symbol groups in one or more repetitions. The OCC multiplexing factor can be configured with at least 4, e.g. 4, 8, 16, or 32, etc. Depending on the configured OCC multiplexing factor, an OCC can extend to multiple repetitions. The multiplexing factor cannot be higher than the multiplication of the number of repetitions and the number of symbol groups in a repetition.

Method 4: Combination of Intra Repetition and Inter Repetition OCC, Type 4 OCC

The intra repetition OCC and inter repetition OCC can be configured and applied independently or jointly. The intra repetition OCC multiplexing factor and inter repetition OCC factor can be configured separately or jointly.

If both intra repetition OCC and inter repetition OCC are configured:

- Approach 1: the resulting multiplexing capacity or multiplexing factor is determined by the multiplication of the intra repetition OCC multiplexing factor and the inter repetition OCC multiplexing factor.
  - Intra repetition OCC is applied first on symbol groups in a repetition.
  - Inter repetition OCC is applied over the repetitions with intra repetition OCC.
  - May potentially support higher multiplexing capacity especially when the number of repetitions is small.
- Approach 2: the inter repetition OCC overrides the intra repetition OCC.
  - If inter repetition OCC multiplexing is configured, intra repetition OCC multiplexing is disabled even if it is configured.
  - Limited multiplexing capabilities when the number of repetitions is small.
- Whether to use Approach 1 or Approach 2 may be configured by a parameter in NPRACH configuration or with a higher layer signaling. Alternatively, whether to use Approach 1 or Approach 2 may be determined by the number of NPRACH preamble repetitions and/or coverage enhancement (CE) level.

The OCC methods may be applied to Transport Network (TN) NB-IoT UEs as well. If so, both intra repetition OCC and inter repetition OCC should be supported. For different coverage enhancement levels, intra repetition OCC is more suitable for low Coverage Enhancement (CE) level with no repetition or very small number of repetitions.

Random Access Response Scheduling for Preambles with Multiplexing in IoT NTN

The eNB may determine both the NPRACH index and the OCC index(es) especially if multiple preambles with different OCC indexes are detected. To signal to a specific UE, additional information for the OCC index should be carried or indicated in the Narrowband Physical Downlink Control Channel (NPDCCH) for the RAR.

Solution 1: Indicate the OCC Index in the NPDCCH Downlink Control Information (DCI) Format N1 for Narrowband Internet of Things Random Access Response (NB-IoT RAR)

The 5 reserved bits in NPDCCH format N1 for RAR scheduling may be used to indicate the OCC index when OCC multiplexing is supported for NPRACH preamble transmissions. The number of bits required depends on the configured OCC multiplexing method and the OCC multiplexing factors.

Solution 2: Apply Different RA-RNTI Numbers for Different OCC Indexes

To differentiate different OCC indexes on the same NPRACH resource, additional offset values can be included in the RA-RNTI formula. The offsets should be selected so that the result will not collide with RA-RNTI from other PRACH resources. For example, RA-RNTI=1+floor (SFN_id/4)+256*carrier_id+256/OCC_factor *OCC_id Solution 3: Apply Different Scrambling Sequences for Different OCC Indexes Different OCC indexes may be differentiated by applying different NPDCCH scrambling sequences.

Solution 4: Add the OCC Index in the RAR, e.g. In the Media Access Control (MAC) CE The OCC index may be added to the MAC CE for RAR, e.g. in the uplink (UL) grant information in the RAR.

Collision Resolution with Msg 3 Transmission for NPRACH with OCC

Alternatively, if the OCC index is not indicated in the RAR, some methods should be specified in Msg 3 transmission to avoid collision between of UEs that transmit different NPRACH OCC indexes and receive the same RAR.

- In one approach, for UEs support NPRACH preamble OCC multiplexing, the Narrowband Physical Uplink Shared Channel (NPUSCH) resource is determined based on RAR UL grant and the OCC index of the transmitted NPRACH preamble. Offset values are used so that a different starting subcarrier index is used for a different OCC index.
- In another approach, for UEs support NPRACH preamble OCC multiplexing, NPUSCH OCC multiplexing is also supported. Thus, the NPUSCH resource is determined based on RAR UL grant, the UE applies the same NPRACH OCC index on the NPUSCH.

FIG. 1 is a diagram 100 illustrating an example 100 of a non-terrestrial network (NTN) coverage area with a plurality of beams. The Next Generation Radio Access Network (NG-RAN) 102 includes an NTN-Platform 104 in communication with an NTN-Gateway 108 through a 5G air interface, such an NR-Uu 106 (New Radio User Equipment (UE) to the NR Node B (gNB) radio interface). The NG-RAN 102 also includes a base station device (gNB) 110. The gNB 110 includes an S-gNB-CU (Secondary gNodeB Control Unit) 112 and an S-gNB-DU (Secondary gNodeB Distributed Unit) 114 in communication with each unit via F1 interfaces.

The NTN coverage area includes a plurality of beams having footprints: beam footprints 1, 2, 3, . . . N (124, 126, 128, 130). The 5G Core network (5GC) 118 is in communication with the NG-RAN 102 and a data network 122, such as a global communications network or other data network.

A. IoT-NTN Study on Uplink Enhancement

Need for Uplink capacity enhancement: NB-IoT NTN is currently being used. In these early and upcoming deployments, it is emerging that IoT-NTN, in particular NB-IoT, will have to support massive capacity in terms of number and types of UEs, some of which will have worse characteristics than others (e.g. low cost devices, wearables, etc.). Multiplexing of UEs by usage of orthogonal cover codes (OCC) for Narrowband Physical Uplink Shared Channel (NPUSCH) format 1 and NPRACH should therefore be studied, and if beneficial be specified and utilized. Therefore, in order to unlock the additional Uplink (UL) capacity potential, there is a need to identify methods to de-couple the UL from the Downlink (DL) as much as possible.

For the support of capacity enhancements for uplink, the aim is to study then specify, if beneficial, enhancements to enable multiplexing of multiple UEs (e.g. up to the minimum of 4 and the maximum allowed by the existing UL and DL signaling) in a single 3.75 kilohertz (kHz) or 15 kHz subcarrier via orthogonal cover codes (OCC) for NPUSCH format 1 and NPRACH.

B. NPRACH for NB-IoT

For NB-IoT frame structure, frame structure type 1 is applicable to Frequency Division Duplexing (FDD) operation only, and frame structure type 2 is applicable to Time Division Duplexing (TDD) operation only.

Figures 2, 3:
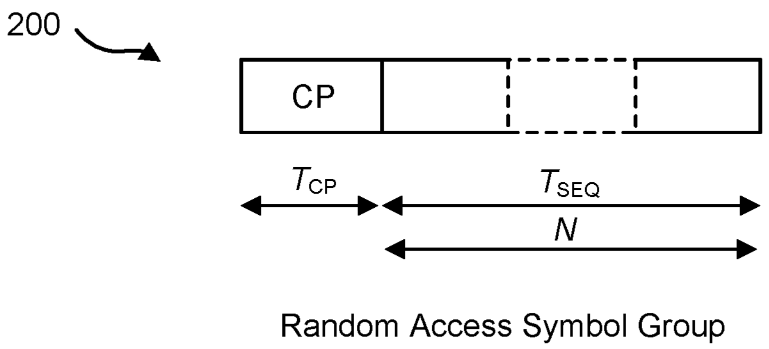
FIG. 2 is a diagram illustrating an example of a random access symbol group.
FIG. 3 is a table illustrating an example of random access preamble parameters for a frame structure.

FIG. 2 is a diagram 200 of an example of a random access symbol group which is used by a UE to gain access to the network.

FIG. 3 is a table 300 of an example of random access preamble parameters for frame structure type 1.

The physical layer random access preamble is based on single-subcarrier frequency-hopping symbol groups. A symbol group is illustrated in FIGS. 2-3, comprised of a cyclic prefix (CP) of length $T_{Cp}$ and a sequence of N identical symbols with total length $T_{SEQ}$. The total number of symbol groups in a preamble repetition unit is denoted by P. The number of time-contiguous symbol groups is given by G.

The parameter values for frame structures 1 and 2 are listed in FIGS. 3-4, respectively.

FIG. 4 is a table 400 illustrating an example of random access preamble parameters for frame structure type 2. Various examples of preamble formats, configurations, symbol groups, CP lengths and total lengths are shown.

The preamble consisting of P symbol groups shall be transmitted $$N_{rep}^{NPRACH}$$

times. For frame structure type 2, when an invalid uplink subframe overlaps the transmission of G symbol groups without a gap, the G symbol groups are dropped. For frame structure type 2, the transmission of G symbol groups are aligned with the subframe boundary.

The transmission of a random-access preamble, if triggered by the Medium Access Control (MAC) layer, is restricted to certain time and frequency resources.

A NPRACH configuration provided by higher layers contains the following:

NPRACH resource periodicity $$N_{period}^{NPRACH}(nprach\text{–Periodicity}).$$

Frequency location of the first subcarrier allocated to $$NPRACH\ N_{scoffset}^{NPRACH}$$

Number of subcarriers allocated to $$NPRACH\ N_{sc}^{NPRACH}(nprach - NumSubcarries).$$

Number of starting sub-carriers allocated to UE initiated random access $$N_{sc\_cont}^{NPRACH}(nprach\text{–}NumCBRA\text{–}StartSubcarriers).$$

Number of NPRACH repetitions per attempt $$N_{rep}^{NPRACH}(numRepetitionsPerPreambleAttempt).$$

NPRACH starting time $$N_{start}^{NPRACH}(nprach\text{–}StartTime).$$

Fraction for calculating starting subcarrier index for the range of NPRACH subcarriers reserved for indication of UE support for multi-tone msg3 transmission $$N_{MSG3}^{NPRACH}(nprach - SubCarrierMSG3 - RangeStart).$$

An NPRACH transmission can start only $$N_{start}^{NPRACH}\cdot 3072T_s$$

time units after the start of a radio frame fulfilling $$n_f \bmod\left(N_{period}^{NPRACH}/10\right) = 0.$$

For frame structure type 1, after transmissions of $4\cdot 64(T_{CP}+T_{SEQ})$ time units for preamble formats 0 and 1, or $16\cdot 6(T_{CP}+T_{SEQ})$ time units for preamble format 2, a gap of $40\cdot 30720\ T_s$ time units shall be inserted.

NPRACH configurations where $$A_{scoffset}^{NPRACH} + A_{sc}^{NPRACH} > A_{sc}^{UL}$$

are invalid.

The NPRACH starting subcarriers allocated to UE initiated random access are split in two sets of subcarriers, $$\{0, 1, \ldots, \lfloor N_{sc\_cont}^{NPRACH} N_{MSG3}^{NPRACH} \rfloor - 1\} \text{ and}$$

$$\{\lfloor N_{sc\_cont}^{NPRACH} N_{MSG3}^{NPRACH} \rfloor, \ldots, N_{sc\_cont}^{NPRACH} - 1\},$$

where the second set, if present, indicates UE support for a multi-tone msg3 transmission.

The frequency location of the NPRACH transmission is constrained within $$N_{sc}^{RA} = 12$$

sub-carriers, and within $$N_{sc}^{RA} = 36$$

subcarriers when preamble format 2 as described in FIG. 2 is configured. Frequency hopping shall be used within the 12 subcarriers and 36 subcarriers when preamble format 2 as described in FIG. 2 is configured, where the frequency location of the $i^{th}$ symbol group is given by $$n_{sc}^{RA}(i) = n_{start} + \tilde{n}_{SC}^{RA}(i) \text{ where } n_{start} = N_{scoffset}^{NPRACH} + \lfloor n_{init}/N_{sc}^{RA} \rfloor \cdot N_{sc}^{RA}.$$

The quantity $$\tilde{n}_{sc}^{RA}(i)$$

depends on the frame structure.

For frame structure type 1:

if G=4, P=4 for preamble formats 0 and 1 as described in FIG. 2:

$$\tilde{n}_{sc}^{RA}(i)=\begin{cases}\tilde{n}_{sc}^{RA}(i)=\begin{cases}\left(\tilde{n}_{sc}^{RA}(0)+f(i/4)\right)\bmod N_{sc}^{RA} & i \bmod 4=0 \text{ and } i>0\\ \tilde{n}_{sc}^{RA}(i-1)+1 & i \bmod 4=1,3 \text{ and } \tilde{n}_{sc}^{RA}(i-1) \bmod 2=0\\ \tilde{n}_{sc}^{RA}(i-1)-1 & i \bmod 4=1,3 \text{ and } \tilde{n}_{sc}^{RA}(i-1) \bmod 2=1\\ \tilde{n}_{sc}^{RA}(i-1)+6 & i \bmod 4=2 \text{ and } \tilde{n}_{sc}^{RA}(i-1)<6\\ \tilde{n}_{sc}^{RA}(i-1)-6 & i \bmod 4=2 \text{ and } \tilde{n}_{sc}^{RA}(i-1)\geq 6\end{cases}\end{cases}$$

$$f(t)=\left(f(t-1)+\left(\sum_{n=10t+1}^{10t+9}c(n)2^{n-(10t+1)}\right)\bmod\left(N_{sc}^{RA}-1\right)+1\right)\bmod N_{sc}^{RA}$$

$$f(-1)=0$$

Where $$\tilde{n}_{SC}^{RA}(0)=n_{init} \bmod N_{sc}^{RA}$$

with $n_{init}$ being the subcarrier selected by the MAC layer from $$\left\{0,1,\ldots,N_{sc}^{NPRACH}-1\right\},$$

and the pseudo random sequence c(n) is given in the related specifications. The pseudo random sequence generator shall be initialized with $$c_{init}=N_{ID}^{Ncell}.$$

if G=6, P=6 for preamble format 2 as described in FIG. 2:

$$\tilde{n}_{SC}^{RA}(i)=\begin{cases}\left(\tilde{n}_{SC}^{RA}(0)+f(i/6)\right)\bmod N_{sc}^{RA} & i \bmod 6 =0 \text{ and } i>0\\ \tilde{n}_{SC}^{RA}(i-1)+1 & i \bmod 6 =1,5 \text{ and } \tilde{n}_{SC}^{RA}(i-1)\bmod 2=0\\ \tilde{n}_{SC}^{RA}(i-1)-1 & i \bmod 6 =1,5 \text{ and } \tilde{n}_{SC}^{RA}(i-1)\bmod 2=1\\ \tilde{n}_{SC}^{RA}(i-1)+3 & i \bmod 6 =2,4 \text{ and } \left\lfloor\tilde{n}_{SC}^{RA}(i-1)/3\right\rfloor \bmod 2=0\\ \tilde{n}_{SC}^{RA}(i-1)-3 & i \bmod 6 =2,4 \text{ and } \left\lfloor\tilde{n}_{SC}^{RA}(i-1)/3\right\rfloor \bmod 2=1\\ \tilde{n}_{SC}^{RA}(i-1)+18 & i \bmod 6 =3 \text{ and } \tilde{n}_{SC}^{RA}(i-1)<18\\ \tilde{n}_{SC}^{RA}(i-1)-18 & i \bmod 6 =3 \text{ and } \tilde{n}_{SC}^{RA}(i-1)\geq 18\end{cases}$$

$$f(t)=\left(f(t-1)+\left(\sum_{n=10t+1}^{10t+9}c(n)2^{n-(10t+1)}\right)\bmod\left(N_{sc}^{RA}-1\right)+1\right)\bmod N_{sc}^{RA}$$

$$f(-1)=0$$

Where $$\tilde{n}_{SC}^{RA}(0)=n_{init} \bmod N_{sc}^{RA}$$

with $n_{init}$ being the subcarrier selected by the MAC layer from $$\left\{0,1,\ldots,N_{sc}^{NPRACH}-1\right\},$$

and the pseudo random sequence c(n) is given in the related specifications. The pseudo random sequence generator shall be initialized with $$c_{init}=N_{IV}^{Ncell}.$$

For frame structure type 2:
if G=2, P=4 for preamble formats 0, 1, and 2 as described in FIG. 4:

$$\tilde{n}_{SC}^{RA}(i)=\begin{cases} Y & i \bmod 8=0,2 \text{ and } i>0\\ \tilde{n}_{SC}^{RA}(i-1)+1 & i \bmod 8=1 \text{ and } \tilde{n}_{SC}^{RA}(i-1)=0,2,4,6,8,10\\ \tilde{n}_{SC}^{RA}(i-1)-1 & i \bmod 8=1 \text{ and } \tilde{n}_{SC}^{RA}(i-1)=1,3,5,7,9,11\\ \tilde{n}_{SC}^{RA}(i-1)+6 & i \bmod 8=3 \text{ and } \tilde{n}_{SC}^{RA}(i-1)=0,1,2,3,4,5\\ \tilde{n}_{SC}^{RA}(i-1)-6 & i \bmod 8=3 \text{ and } \tilde{n}_{SC}^{RA}(i-1)=6,7,8,9,10,11\\ 2\left\lfloor\frac{Y}{2}\right\rfloor+1 & i \bmod 8=4 \text{ and } \tilde{n}_{SC}^{RA}(i-4)=0,2,4,6,8,10\\ 2\left\lfloor\frac{Y}{2}\right\rfloor & i \bmod 8=4 \text{ and } \tilde{n}_{SC}^{RA}(i-1)=1,3,5,7,9,11\\ \tilde{n}_{SC}^{RA}(i-1)-1 & i \bmod 8=5 \text{ and } \tilde{n}_{SC}^{RA}(i-1)=1,3,5,7,9,11\\ \tilde{n}_{SC}^{RA}(i-1)+1 & i \bmod 8=5 \text{ and } \tilde{n}_{SC}^{RA}(i-1)=0,2,4,6,8,10\\ Y \bmod 6+6 & i \bmod 8=6 \text{ and } \tilde{n}_{SC}^{RA}(i-4)=0,1,2,3,4,5\\ Y \bmod 6 & i \bmod 8=6 \text{ and } \tilde{n}_{SC}^{RA}(i-4)=6,7,8,9,10,11\\ \tilde{n}_{SC}^{RA}(i-1)-6 & i \bmod 8=7 \text{ and } \tilde{n}_{SC}^{RA}(i-1)=6,7,8,9,10,11\\ \tilde{n}_{SC}^{RA}(i-1)+6 & i \bmod 8=7 \text{ and } \tilde{n}_{SC}^{RA}(i-1)=0,1,2,3,4,5\end{cases}$$

$$Y=\left(\tilde{n}_{SC}^{RA}(0)+f(i/2)\right)\bmod N_{sc}^{RA}$$

$$f(t)=\left(f(t-1)+\left(\sum\nolimits_{n=10t+1}^{10t+9}c(n)2^{n-(10t+1)}\right)\bmod\left(N_{sc}^{RA}-1\right)+1\right)\bmod N_{sc}^{RA}$$

-continued $$f(-1)=0$$

$$\text{Where } \tilde{n}_{SC}^{RA}(0)=n_{init} \bmod N_{sc}^{RA}$$

with $n_{init}$ being the subcarrier selected by the MAC layer from $$\{0, 1, \ldots, N_{SC}^{NPRACH}-1\},$$

and the pseudo random sequence c(n) is given in the related specifications. The pseudo random sequence generator shall be initialised with $$c_{init}=N_{ID}^{Ncell}.$$

if G=3, P=6 for preamble formats 0-a, 1-a, as described in FIG. 4:

$$\tilde{n}_{SC}^{RA}(i)=$$

$$\begin{cases} \left(\tilde{n}_{SC}^{RA}(0)+f(i/3)\right) \bmod N_{sc}^{RA} & i \bmod 6=0, 3 \text{ and } i>0 \\ \tilde{n}_{SC}^{RA}(i-1)+1 & i \bmod 6=1 \text{ and } \tilde{n}_{SC}^{RA}(i-1)=0, 2, 4, 6, 8, 10 \\ \tilde{n}_{SC}^{RA}(i-1)-1 & i \bmod 6=2 \text{ and } \tilde{n}_{SC}^{RA}(i-2)=0, 2, 4, 6, 8, 10 \\ \tilde{n}_{SC}^{RA}(i-1)-1 & i \bmod 6=1 \text{ and } \tilde{n}_{SC}^{RA}(i-1)=1, 3, 5, 7, 9, 11 \\ \tilde{n}_{SC}^{RA}(i-1)+1 & i \bmod 6=2 \text{ and } \tilde{n}_{SC}^{RA}(i-2)=1, 3, 5, 7, 9, 11 \\ \tilde{n}_{SC}^{RA}(i-1)+6 & i \bmod 6=4 \text{ and } \tilde{n}_{SC}^{RA}(i-1)=0, 1, 2, 3, 4, 5 \\ \tilde{n}_{SC}^{RA}(i-1)-6 & i \bmod 6=5 \text{ and } \tilde{n}_{SC}^{RA}(i-2)=0, 1, 2, 3, 4, 5 \\ \tilde{n}_{SC}^{RA}(i-1)-6 & i \bmod 6=4 \text{ and } \tilde{n}_{SC}^{RA}(i-1)=6, 7, 8, 9, 10, 11 \\ \tilde{n}_{SC}^{RA}(i-1)+6 & i \bmod 6=5 \text{ and } \tilde{n}_{SC}^{RA}(i-2)=6, 7, 8, 9, 10, 11 \end{cases}$$

$$f(t)=\left(f(t-1)+\left(\sum_{n=10t+1}^{10t+9} c(n)2^{n-(10t+1)}\right) \bmod \left(N_{sc}^{RA}-1\right)+1\right) \bmod N_{sc}^{RA}$$

$$f(-1)=0$$

$$\text{Where } \tilde{n}_{SC}^{RA}(0)=n_{init} \bmod N_{sc}^{RA}$$

with $n_{init}$ being the subcarrier selected by the MAC layer from $$\{0, 1, \ldots, N_{SC}^{NPRACH}-1\},$$

and the pseudo random sequence c(n) is given in the related specifications. The pseudo random sequence generator shall be initialised with $$c_{init}=N_{ID}^{Ncell}.$$

Baseband Signal Generation

The time-continuous random-access signal $s_i(t)$ for symbol group i is defined by:

$$s_i(t)=\beta_{NPRACH}e^{j2\pi\left(n_{SC}^{RA}(i)+Kk_0+1/2\right)\Delta f_{RA}\left(t-T_{CP}\right)}$$

Where $0 \le t \le T_{SEQ}+T_{CP}$, $\beta_{NPRACH}$ is an amplitude scaling factor in order to conform to the transmit power $P_{NPRACH}$, $$k_0=-N_{sc}^{UL}/2,\ K=\Delta f/\Delta f_{RA}$$

accounts for the difference in subcarrier spacing between the random access preamble and uplink data transmission, and the location in the frequency domain controlled by the parameter $$n_{sc}^{RA}(i)$$

is derived in the related specifications. The variable $\Delta f_{RA}$ is given by FIG. 5.

FIG. 5 is a table 500 illustrating an example of random access baseband parameters. FIG. 5 illustrates various preamble formats and the variable $\Delta f_{RA}$.

Figure 6:
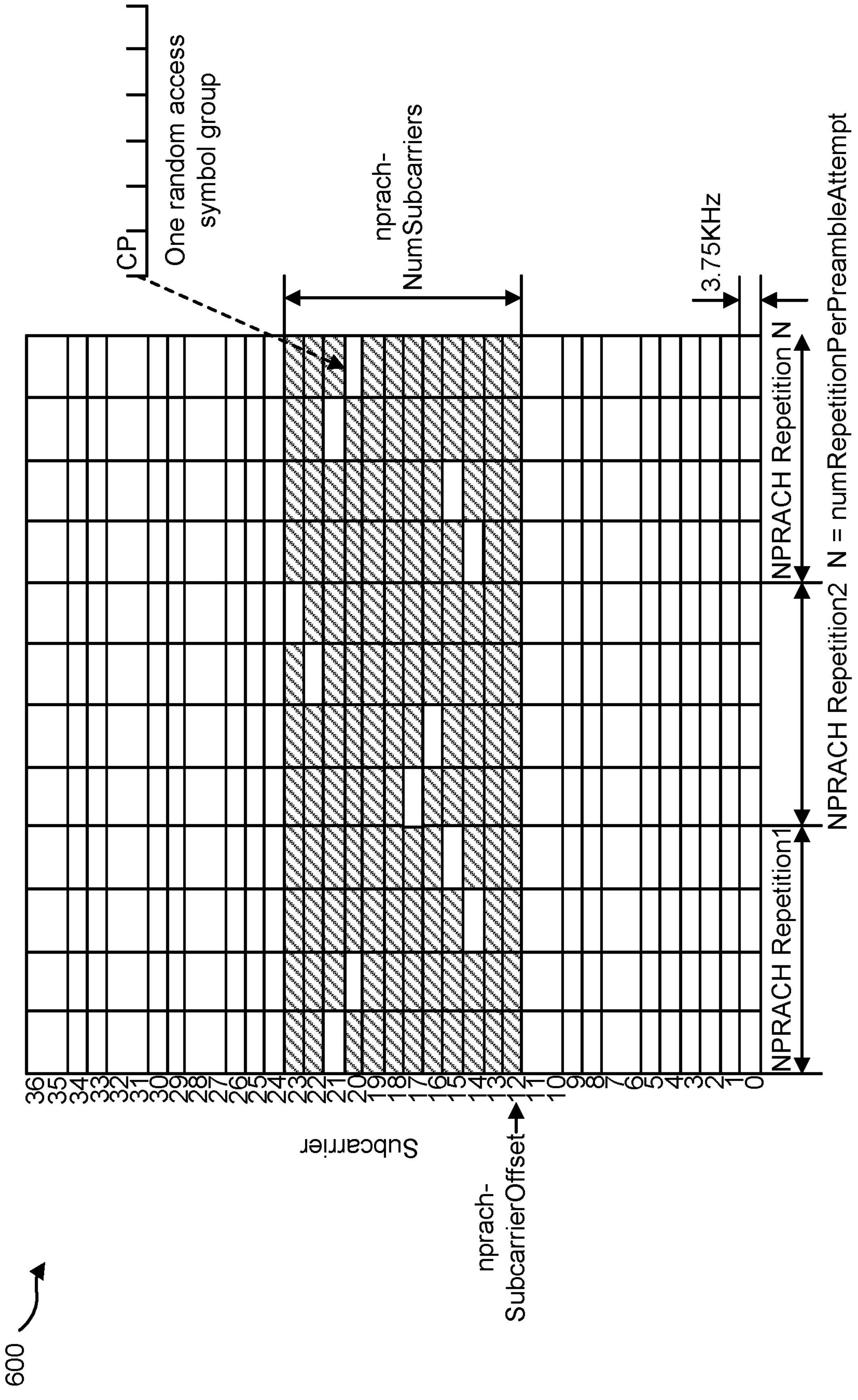
FIG. 6 is a diagram illustrating an example of an NPRACH transmission with repetitions.

FIG. 6 is a diagram 600 showing an example of an NPRACH transmission with frame structure type 1 with preamble format 0 or format 1. As shown in FIG. 6, each NPRACH repetition consists of P=4 random access symbol groups, where a symbol group with a Cyclic Prefix (CP) and N=5 symbols. The hopping rule is given by $$\tilde{n}_{sc}^{RA}(i)$$

above The NPRACH is repeated until the number of NPRACH repetitions per attempt $$N_{rep}^{NPRACH}(numRepetitionsPerPreambleAttempt)$$

is reached.

Coverage Enhancement (CE) Levels

The NB-IoT standard supports three so-called Coverage Enhancement (CE)-Levels to address the different radio conditions, based on reference signal receive power (RSRP) thresholds. The value of the RSRP is computed in the NB-IoT UE devices by averaging the received power over the Resource Elements (REs) carrying the New Radio Synchronization (NRS) within the considered NB-IoT bandwidth. Each CE Level determines the number of times downlink and uplink messages can be repeated to reach devices in poor coverage and the number of repetitions in each CE-Level is predefined by the network.

Figure 7:
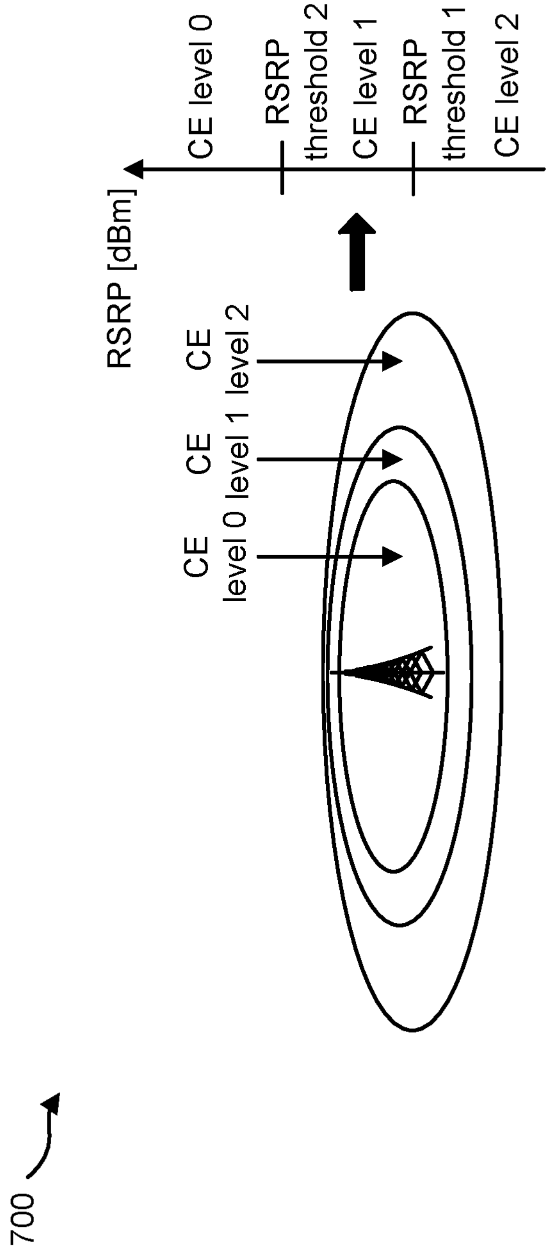
FIG. 7 is a diagram illustrating an example of Narrowband Internet of Things (NB-IoT) Coverage Enhancement (CE) levels.

In NB-IoT, two RSRP thresholds can be defined per cell; thus, there are at most three CE levels, as shown in FIG. 7. FIG. 7 is a diagram 700 illustrating an example of NB-IoT CE levels. Every UE in the NB-IoT cell computes its RSRP level and then, depending on the obtained value, selects the corresponding CE level according to the defined RSRP thresholds. Due to the long distances satellite links, the IoT NTN devices are most likely in the high CE level.

Most of the essential information about the NB-IoT cells are transmitted in SIB2-NB. This includes the information on the RSRP thresholds and the parameters of NPRACH scheduling. A separate NPRACH configuration is configured for each CE level (i.e., in case RSRP thresholds are included in SIB2-NB). The parameters of each CE level are configured separately. An NB-IoT UE applies a different configuration for NPRACH transmissions according to its CE level (e.g., different number of repetitions, frequency location, etc.).

In general, the NPRACH occasions of different CE levels should not overlap in frequency and time domain. Thus, the NPRACH parameters dedicated to each CE level can take different values while respecting several constraints defined by 3GPP. For example, the number of repetition parameters should be different in each CE level and the values should be in increasing order, i.e., the $$N_{rep}^{NPRACH} \text{ of } CE2$$

is bigger than the one for CE1 and CE0.

C. NPRACH Multiplexing with Orthogonal Cover Code (OCC)

Compared with a terrestrial network (TN), an NTN link with satellite forwarding has a longer distance and a weaker signal. Thus, more repetitions may be needed for PRACH preamble transmissions. Furthermore, an NTN satellite has a very large coverage area, and the number of NB-IoT devices in the coverage area can be very large. Thus, for a given NPRACH configuration, the collision of PRACH preambles between NTN IoT devices may occur more frequently. Therefore, multiplexing with orthogonal cover code (OCC) is highly desirable, and can bring significant system performance enhancements on random access capacity.

Several methods of OCC multiplexing can be considered. The multiplexing capability of an OCC is also known as OCC length, OCC spreading factor, the multiplexing factor, and OCC multiplexing capability, etc.

Method 1: Intra Repetition OCC Multiplexing Only, Type 1 OCC

In one method, OCC is applied among the random access symbol groups in a NPRACH repetition. This method can be named as inner-OCC, inner-multiplexing, intra-Repetition-OCC, or intra-Repetition-multiplexing, etc. The total number of symbol groups in a preamble repetition unit is denoted by P. Thus, the multiplexing capability of intra-Repetition-multiplexing is determined by the value P.

Thus, for preamble format 0 and format 1, OCC multiplexing factor of 4 can be applied on the 4 random access symbol groups in a NPRACH repetition. A sample OCC code is given as [+1, +1, +1, +1][+1, −j, −1, +j][+1, −1, +1, −1][+1, +j, −1, −j] for OCC multiplexing factor of 4. Also, OCC multiplexing factor of 2 can be configured on the 4 random access symbol groups in a NPRACH repetition. A sample OCC code is given as [+1, +1][+1, −1] for OCC multiplexing a factor of 2.

For preamble format 2, up to a OCC multiplexing factor of 6 can be achieved, although it is possible to support only a OCC multiplexing factor of 4.

With method 1, the multiplexing factor is fixed and limited by the number of symbol groups in each NPRACH repetition, e.g., can only support up to 4×OCC for NPRACH format 0 and format 1. Method 1 is easier for OCC to apply on each basic structure for NPRACH transmissions, and can be shared with NB-IoT devices with different repetition factors.

For an IoT NTN device, the legacy methods are used to determine the NPRACH resource, NPRACH format, and preamble sequence generation, etc. If intra repetition OCC is configured, the UE will pick an OCC index randomly in the set of OCC codes, and apply to the symbol groups in each NPRACH repetition. Each entry in an OCC index is applied on a symbol group by bit-width multiplication with the sequence. For example, for an OCC factor of 4 and a selected OCC code index 2 with [+1, −j, −1, +j], the symbol groups in a repetition [symgroup0, symgroup1, symgroup2, symgroup3] is multiplexed with the OCC indexes and the resulting output is given by [symgroup0, −j*symgroup1, −symgroup2, j*symgroup3]. The same selected OCC is applied in all repetitions of the NPRACH transmissions.

The OCC multiplexing may be extended to TN NB-IoT. The intra repetition OCC may be very useful to provide multiplexing capabilities for TN NB-IoT, especially for devices with a very small number of NPRACH repetitions, and/or with a low CE level.

Method 2: Inter Repetition OCC Multiplexing Only, Type 2 OCC

In another method, OCC is applied among the preamble repetitions. This method can be named as outer-OCC, outer-multiplexing, inter-Repetition-OCC, or inter-Repetition-multiplexing, etc. The preamble consisting of P symbol groups shall be transmitted $$N_{rep}^{NPRACH}$$

times. Thus, the multiplexing capability of intra-Repetition-multiplexing is determined by the parameter $$N_{rep}^{NPRACH}.$$

The inter repetition OCC multiplexing factor can be configured, e.g. 2, 4, 8, 16, and 32, etc. The OCC multiplexing factor can be longer depending on the number of repetition parameters as long as the inter repetition OCC multiplexing factor is not higher than the configured number of repetitions numRepetitionsPerPreambleAttempt. A larger number of multiplexing factors should be configured for larger repetition factors to reduce the collision probability.

The values of numRepetitionsPerPreambleAttempt is ENUMERATED {n1, n2, n4, n8, n16, n32, n64, n128}. For example, if a maximum OCC multiplexing factor of 32 is supported, the following OCC multiplexing factors can be configured for different values of numRepetitionsPerPreambleAttempt.

- numRepetitionsPerPreambleAttempt=n1, no OCC
- numRepetitionsPerPreambleAttempt=n2, support 2×OCC
- numRepetitionsPerPreambleAttempt=n4, support 2×, and 4×OCC
- numRepetitionsPerPreambleAttempt=n8, support 2×, 4×, and 8×OCC
- numRepetitionsPerPreambleAttempt=n16, support 2×, 4×, 8×, and 16×OCC
- numRepetitionsPerPreambleAttempt=n32, support 2×, 4×, 8×, 16×, and 32×OCC
- numRepetitionsPerPreambleAttempt=n64, support 2×, 4×, 8×, 16×, and 32×OCC
- numRepetitionsPerPreambleAttempt=n128, support 2×, 4×, 8×, 16×, and 32×OCC The maximum OCC multiplexing factor may be smaller, e.g. only 8 or 16. The maximum configurable OCC multiplexing factor is determined by the minimum between numRepetitionsPerPreambleAttempt and the maximum OCC multiplexing factor.

The OCC length is the same as the multiplexing factor. Thus, a longer OCC is required to support a larger multiplexing factor or multiplexing capability. For example, to support a multiplexing factor of 4, the following code can be reused: [+1, +1][+1, −1] for 2×, [+1, +1, +1, +1][+1, −j, −1, +j][+1, −1, +1, −1][+1, +j, −1, −j].

For an IoT NTN device, the legacy methods are used to determine the NPRACH resource, NPRACH format, and preamble sequence generation, etc. If inter repetition OCC is configured, the UE will pick an OCC index randomly in the set of OCC codes, and apply to the NPRACH repetitions. Each entry in an OCC index is applied on a repetition by bit-width multiplication with the sequence. The OCC multiplexing factor should be smaller or equal to the number of repetitions.

For example, for an OCC factor of 4 and a selected OCC code index 2 with [+1, −j, −1, +j], and the number of repetitions is 16, the first group of repetitions is [rep0, rep1, rep2, rep3] is multiplexed with the OCC indexes and the resulting output is given by [rep0, −j*rep1, −rep2, j*rep3]. The same selected OCC is applied to later groups of repetitions until all repetitions of the NPRACH transmission are included.

The OCC multiplexing may be extended to TN NB-IoT, the inter repetition OCC may be used to provide multiplexing capabilities for TN NB-IoT, especially for devices with a larger number of NPRACH repetitions, e.g. 32 or 64 repetitions. For devices with a small number of NPRACH repetitions, e.g. no repetition or only 2 repetitions with coverage enhancement level 0 (CE0), the inter repetition OCC multiplexing may not be sufficient.

Method 3: OCC Multiplexing on Symbol Groups within and Across Repetitions, Type 3 OCC Yet in another method, OCC is applied among the random access symbol groups in one or more repetitions. Similar to Method 1, the OCC is applied on each symbol group. Instead of a fixed multiplexing factor in Method 1, the OCC multiplexing factor can be configured with at least 4, e.g. 4, 8, 16, or 32, etc. Depending on the configured OCC multiplexing factor, an OCC can extend to multiple repetitions, e.g. with P=4, and OCC multiplexing factor of 16, the OCC occupies 4 consecutive repetitions. Obviously, the multiplexing factor cannot be higher than the multiplication of the number of repetitions and the number of symbols in a repetition.

For an IoT NTN device, the legacy methods are used to determine the NPRACH resource, NPRACH format, and preamble sequence generation, etc. If an OCC multiplexing is configured, the UE will pick an OCC index randomly in the set of OCC codes, and apply to the symbol groups in one or more NPRACH repetitions. Each entry in an OCC index is applied on a symbol group by bit-width multiplication with the sequence. The same selected OCC is applied until all symbol groups in all repetitions of the NPRACH transmissions are included.

With Method 3, for a larger multiplexing factor, a longer OCC length should be used. A sequence of a single OCC index may be applied to symbol groups in multiple NPRACH repetitions.

Method 4: Combination of Intra Repetition and Inter Repetition OCC, Type 4 OCC

Yet in another method, OCC is applied among the random access symbol groups in one or more repetitions, and achieved by the combination of intra repetition OCC and inter repetition OCC. The intra repetition OCC and inter repetition OCC can be configured and applied independently or jointly.

If only intra repetition OCC is configured, Method 4 is the same as Method 1. If only inter repetition OCC is configured, Method 4 is the same as Method 2.

In one approach (Approach 1), if both intra repetition OCC and inter repetition OCC are configured, the NTN IoT device will first perform intra repetition OCC as in Method 1 for all NPRACH repetitions. Then apply inter repetition OCC as in Method 2 on the repetitions with intra repetition OCC applied in the first step.

By applying both intra repetition OCC and inter repetition OCC, the resulting multiplexing capacity or multiplexing factor is determined by the multiplication of intra repetition OCC multiplexing factor and the inter repetition OCC multiplexing factor. Thus, the multiplexing capability can be achieved with shorter OCC sequences. For example, a multiplexing factor of 16 can be obtained by an intra repetition OCC multiplexing factor of 4, and an inter repetition OCC multiplexing factor of 4.

With both intra and inter repetition multiplexing, the intra repetition multiplexing factor can be fixed as P, e.g. P=4 for NPRACH format 0 and 1. Only the inter repetition multiplexing factor needs to be configured. The inter repetition multiplexing factor can be configured with 2, 4, 8, etc. to obtain a total of 8, 16, and 32 overall multiplexing factors. In this case, the OCC multiplexing should be performed twice, thus Method 4 is more complicated than single OCC multiplexing.

In order to reduce the complexity of OCC multiplexing, an alternative approach (Approach 2) may be considered to override the intra repetition multiplexing if inter repetition multiplexing is configured. That is, if inter repetition OCC multiplexing is configured, intra repetition OCC multiplexing is disabled even if it is configured. Thus, Method 4 will be the same as Method 2 if both intra repetition OCC multiplexing and inter repetition OCC multiplexing are configured.

Approach 1 can support more flexible OCC multiplexing with two OCC procedures at intra repetition and inter repetition stages respectively. Thus, shorter OCC length can be used especially for the inter repetition multiplexing. For the same multiplexing factor, a common OCC structure can be used for both intra repetition and inter repetition cases.

Furthermore, Approach 1 can support a larger OCC multiplexing factor when the number of repetitions is limited. For example, when extended to TN with low coverage enhancement level, the repetition factor may be only 2. By combining intra repetition OCC with inter repetition OCC, the NPRACH multiplexing capability can be greatly enhanced. On the other hand, Approach 1 is more complicated because two steps of OCC multiplexing are performed.

Comparatively, Approach 2 is simpler, only one OCC multiplexing is performed. However, to achieve a higher multiplexing factor, a longer OCC length should be configured for the inter repetition multiplexing. Thus, it is not as flexible as Approach 1. Furthermore, for NPRACH configured with a small number of repetitions, the multiplexing capability will be very limited as well.

Therefore, Approach 1 and Approach 2 have pros and cons. If only one approach is specified, either Approach 1 or Approach 2 can be selected. A new parameter may be indicated in the NPRACH configuration to indicate the approach to be used. Alternatively and/or additionally, a new parameter with higher layer signaling, e.g. Radio Resource Control (RRC) signaling can be used to indicate which approach should be used in case of both intra repetition OCC multiplexing and inter repetition OCC multiplexing are configured.

Yet in another case, whether Approach 1 or Approach 2 is applied is determined by the number of repetitions numRepetitionsPerPreambleAttempt. If the number of repetitions is small, e.g. less than 4 or 8, Approach 1 is applied to provide higher potential multiplexing capabilities. On the other hand, if the number of repetitions is larger, e.g. greater than 8 or 16, there may be enough multiplexing capability with inter repetition OCC, Approach 2 is used.

Alternatively and/or additionally, whether Approach 1 or Approach 2 is applied may be determined by the CE level of a given NB-IoT UE. For low CE level, e.g. CE0, Approach 1 is used so that intra repetition OCC is applied together with inter repetition OCC if configured to provide more multiplexing capabilities. On the other hand, for CE2 with a large repetition factor, Approach 2 is used since inter repetition OCC may provide enough multiplexing capabilities.

D. Configurations of OCC Multiplexing for NPRACH

The OCC multiplexing factor for NPRACH can be configured in SIB2 NPRACH configuration, including NPRACH-ConfigSIB-NB, and NPRACH-Parameters-NB etc. Some new parameters may be added depending on the supported OCC multiplexing methods.

Method 1 OCC Only

If only intra repetition OCC multiplexing is supported as in Method 1, the multiplexing factor may be configurable and selected between 2 and 4 for preamble format 0 and format 1. Thus, a higher layer parameter can be used to indicate the OCC multiplexing factor, e.g.:

numMultiplexingFactor ENUMERATED {n1, n2, n4}

The parameter n1 means no OCC is applied, n2 means OCC multiplexing factor of 2, and n4 means OCC multiplexing factor of 4. Alternatively, no OCC multiplexing if the parameter numMultiplexingFactor is not configured, only n2 and n4 values are valid.

In another alternative, the multiplexing factor may be fixed in Method 1, e.g. 4 for preamble format 0 and format 1. Thus, a higher layer parameter can be used to indicate whether OCC multiplexing is enabled or not, e.g.:

OCCMultiplexing ENUMERATED {enabled, disabled}

Method 2 OCC Only

If only inter repetition OCC multiplexing is supported as in Method 2, the multiplexing factor may be configurable. Thus, a higher layer parameter can be used to indicate the OCC multiplexing factor, e.g.:

numMultiplexingFactor ENUMERATED {n1, n2, n4, n8, n16, n32}

The parameter n1 means no OCC is applied, n2 means OCC multiplexing factor of 2, n4 means OCC multiplexing factor of 4, n8 means OCC multiplexing factor of 8, n16 means OCC multiplexing factor of 16, and n32 means OCC multiplexing factor of 32.

Alternatively, the multiplexing factor should be at least 4, and no OCC multiplexing if the parameter numMultiplexingFactor is not configured. Thus, the values in the parameter can be reduced and limited to the following:

numMultiplexingFactor ENUMERATED {n4, n8, n16, n32}

Method 3 OCC Only

If OCC multiplexing is supported among the random access symbol groups in one or more repetitions as in Method 3, the multiplexing factor may be configurable. Thus, a higher layer parameter can be used to indicate the OCC multiplexing factor, e.g.:

numMultiplexingFactor ENUMERATED {n1, n2, n4, n8, n16, n32}

Similar to the above, the parameter n1 means no OCC is applied, n2 means OCC multiplexing factor of 2, n4 means OCC multiplexing factor of 4, n8 means OCC multiplexing factor of 8, n16 means OCC multiplexing factor of 16, and n32 means OCC multiplexing factor of 32.

In some examples, the multiplexing factor should be at least 4, and no OCC multiplexing if the parameter numMultiplexingFactor is not configured. Thus, the values in the parameter can be reduced and limited to the following:

numMultiplexingFactor ENUMERATED {n4, n8, n16, n32}

Method 4 with Combinations of Intra and Inter Repetition OCCs

If Method 4 is adopted, thus OCC is applied among the random access symbol groups in one or more repetitions, and achieved by the combination of intra repetition OCC and inter repetition OCC. The intra repetition OCC and inter repetition OCC can be configured and applied independently.

For intra repetition OCC multiplexing, a new parameter can be introduced.

intraRepetitionMultiplexingFactor ENUMERATED {n1, n2, n4}

The parameter n1 means no OCC is applied, n2 means OCC multiplexing factor of 2, and n4 means OCC multiplexing factor of 4. Alternatively, no OCC multiplexing if the parameter is not configured, thus, the n1 value can be removed from the valid entries. In another alternative, the multiplexing factor may be fixed, e.g. 4 for preamble format 0 and format 1. Thus, a higher layer parameter can be used to indicate whether intra repetition OCC multiplexing is enabled or not, e.g.:

intraRepetitionMultiplexing ENUMERATED {enabled, disabled}

For inter repetition OCC multiplexing, a new parameter can be introduced.

interRepetitionMultiplexingFactor ENUMERATED {n1, n2, n4, n8, n16, n32}

The parameter n1 means no OCC is applied, n2 means OCC multiplexing factor of 2, and n4 means OCC multiplexing factor of 4, and so on. Alternatively, no OCC multiplexing if the parameter is not configured, thus, the n1 value can be removed from the valid entries.

Alternatively, if the intra repetition multiplexing factor is fixed, a single multiplexing factor is configured for the overall multiplexing factor, the inter repetition OCC multiplexing factor is calculated by the overall multiplexing factor divided by the intra repetition multiplexing.

Yet in another alternative, if the intra repetition multiplexing factor is fixed, a single multiplexing factor is configured for the inter repetition OCC multiplexing factor, and the overall multiplexing factor is calculated by multiplication of the inter repetition OCC multiplexing factor and the intra repetition multiplexing.

In one approach, the intra repetition and inter repetition multiplexing are performed jointly if both are configured. If the maximum multiplexing factor is limited to 32, the intra repetition multiplexing factor may be fixed as 4, and the inter repetition multiplexing factor may be limited to 8.

In another approach, if inter repetition OCC multiplexing is configured, intra repetition OCC multiplexing is disabled even if it is configured. In this case, the valid values for inter repetition multiplexing factor can be 32 to support a maximum multiplexing factor of 32.

Therefore, if only one approach is specified, either Approach 1 or Approach 2 can be selected.

Alternatively and/or additionally, a higher layer signaling, e.g. RRC signaling can be used to indicated which approach should be used in Method 4.

Yet in another alternative, whether Approach 1 or Approach 2 is applied is determined by the number of repetitions numRepetitionsPerPreambleAttempt. A threshold value can be configured or specified in the standard, Approach 1 is used if the number of repetitions is smaller than the threshold, and Approach 2 is applied if the number of repetitions is greater or equal to the threshold.

Alternatively and/or additionally, whether Approach 1 or Approach 2 is applied may be determined by the CE level of a given NB-IoT UE, e.g. for low CE level such as CE0 with no repetition or very small repetitions, Approach 1 is used. On the other hand, for high CE level, e.g. CE2 with a large repetition factor, Approach 2 is used.

UE Behaviors for NPRACH Preamble Transmissions with OCC Multiplexing

An IoT NTN device or an NB-IoT UE may receive NPRACH configurations including with NPRACH resource configuration, repetition parameters, and orthogonal cover code (OCC) multiplexing methods and OCC multiplexing factors, etc.

For contention based random access, the device selects a NPRACH resource and transmits NPRACH preambles with the configured OCC multiplexing method(s) and multiplexing factor(s).

Base Station Behavior with OCC for NPRACH

With OCC multiplexing method and parameters configured, the eNB will detect the NPRACH sequences by hypothesis tests with all OCC codes of the configured multiplexing method, and find whether one or more NPRACH preamble(s) is(are) received. The eNB may determine both the NPRACH index(es) and the OCC index(es) if NPRACH preamble(s) are detected.

With OCC multiplexing for PRACH preamble transmissions, NPRACH collision occurs only if two or more NTN IoT devices transmit NPRACH preambles using the same NPRACH resource (time/frequency location) with the same OCC index. Even if NTN IoT devices select the same NPRACH resource (time/frequency location), if different OCC indexes are used for different IoT devices, the eNB can receive and detect them at the same time. The maximum number of simultaneous NPRACH preambles in a NPRACH resource is given by the OCC multiplexing factor.

Random Access Response for NPRACH Preambles with Orthogonal Cover Code

Figure 8:
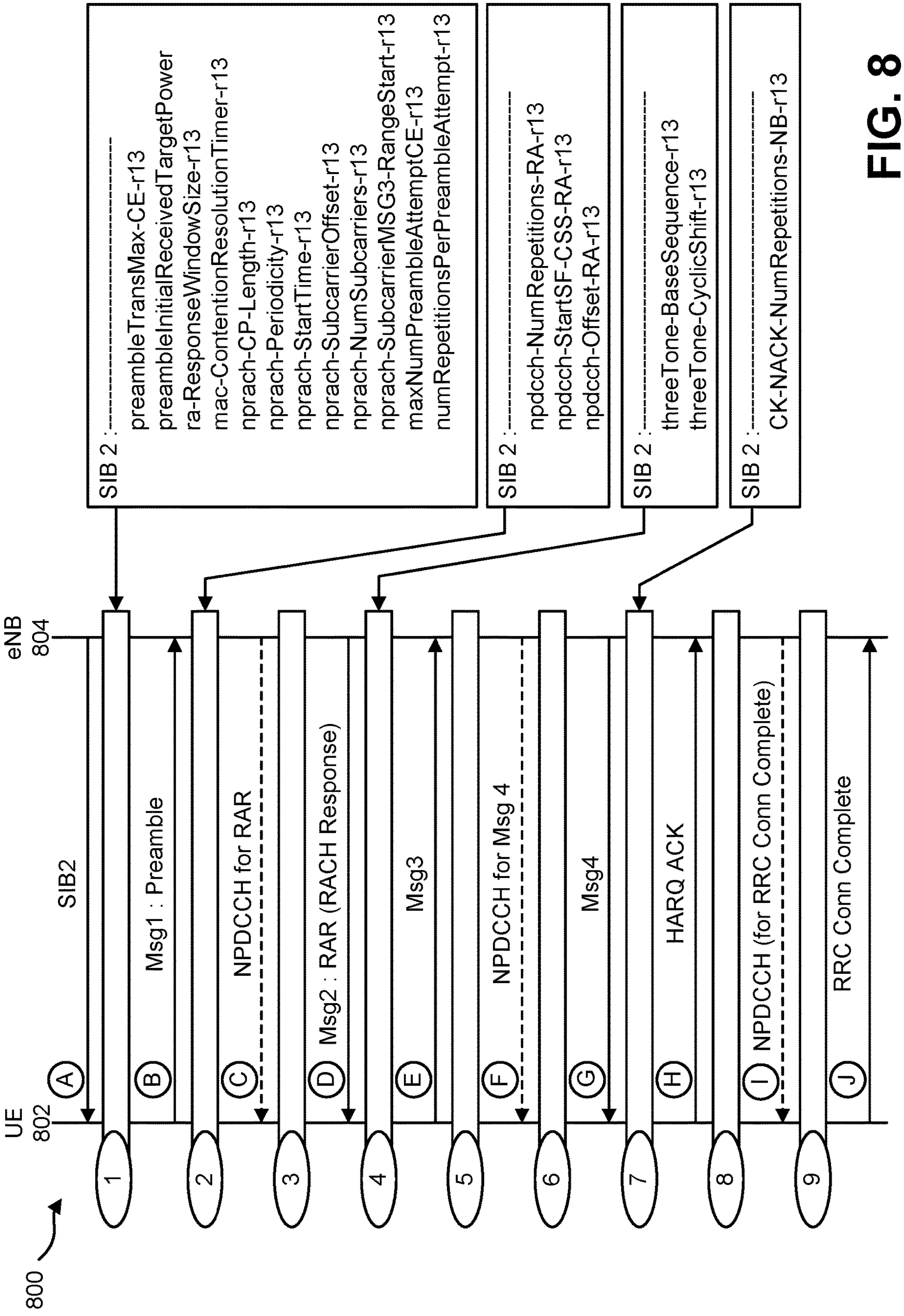
FIG. 8 is a sequence diagram illustrating an example of a Random Access Channel (RACH) procedure for NB-IoT.

FIG. 8 is a sequence diagram 800 illustrating an example of a Random Access Channel (RACH) procedure for NB-IoT. After NPRACH preambles are received and detected, the eNB 804 will send a RACH response (RA) as a response to the random access preambles transmitted by the UE 802. The RAR is scheduled by a NPDCCH for NB-IoT, as shown in FIG. 8.

One possible sequence of messages is illustrated by an SIB2 message at A, a Msgl Preamble at B, an NPDCCH for RAR at C, a Msg2 RAR (RACH Response) at D, Msg3 at E, NPDCCH for Msg4 at F, Msg4 at G, a HARQ ACK at H, an NPDCCH (for RRS Conn Complete) at I and an RRC Conn Complete at J.

If the UE 802 is an NB-IoT UE:

if the random access preamble was transmitted in a non-terrestrial network:

RA Response window starts at the subframe that contains the end of the last preamble repetition plus X subframes plus UE-eNB Round-Trip Time (RTT) and has length ra-ResponseWindowSize for the corresponding enhanced coverage level, where value X is determined from FIG. 9 based on the used preamble format and the number of NPRACH repetitions;

else:

RA Response window starts at the subframe that contains the end of the last preamble repetition plus X subframes and has length ra-ResponseWindowSize for the corresponding enhanced coverage level, where value X is determined from FIG. 9 based on the used preamble format and the number of NPRACH repetitions.

FIG. 9 is a table 900 showing an example of subframes between preamble transmission and RA Response Window in NB-IoT.

For NB-IoT UEs, the RA-RNTI associated with the PRACH in which the Random Access Preamble is transmitted, is computed as:

$$RA\text{-}RNTI = 1 + \text{floor}(\text{SFN\_id}/4) + 256 * \text{carrier\_id}$$

Where SFN_id is the index of the first radio frame of the specified PRACH and carrier_id is the index of the UL carrier associated with the specified PRACH. The carrier_id of the anchor carrier is 0.

For NB-IoT UEs operating in Time Division Duplex (TDD) mode, the RA-RNTI associated with the PRACH in which the Random Access Preamble is transmitted, is computed as:

$$RA\text{-}RNTI = 1 + \text{floor}(\text{SFN\_id}/4) + 256 * (H - SFN \bmod 2)$$

Where SFN_id is the index of the first radio frame of the specified PRACH and H-SFN is the index of the first hyper frame of the specified PRACH. The PDCCH transmission and the PRACH resource are on the same carrier.

The eNB scrambles NPDCCH's Cyclic Redundancy Check (CRC) with RA-RNTI for transmission of Narrowband Physical Downlink Shared Channel (NPDSCH) that carries RAR(s). RA-RNTI can be addressed to multiple UEs, i.e., multiple UEs might decode PDCCH scrambled by the same RA-RNTI. RA-RNTI unambiguously identifies which time-frequency resource was utilized by the UE 802 to transmit the random access preamble.

Thus, currently the RA-RNTI is determined by the PRACH index only. If multiple NTN IoT devices send the NPRACH preambles in the same PRACH resource, the same RA-RNTI will be used for these UEs.

With OCC multiplexing method and parameters configured, the eNB 804 will detect the NPRACH sequences by hypothesis test with all OCC codes of the configured multiplexing method, and find whether one or more NPRACH preamble(s) is(are) received. The eNB 804 may determine both the NPRACH index and the OCC index(es) especially if multiple preambles with different OCC indexes are detected.

In order to signal to a specific UE, additional information should be carried or indicated in the NPDCCH for the RAR so that only the corresponding UE needs to decode the RAR.

Several solutions may be considered to indicate the OCC index to the UE 802.

Solution 1: Indicate the OCC Index in the NPDCCH DCI Format N1 for NB-IoT RAR

The current RA-RNTI is used for NPDCCH/RAR, the UE 802 is differentiated by additional bits on the OCC index included in the NPDCCH DCI format. The UE 802 determines whether the RAR is to itself by comparing the indicated OCC index with the OCC index it used for the preamble transmissions.

DCI Format N1 is for all NPDSCH (user data and System Information Blocks (SIBs)) except NPDSCH carrying Paging and to trigger PRACH (non-contention based). For NPDCCH triggering NPDSCH for RAR, the format N1 CRC is scrambled by RA-RNTI, and the DCI fields are summarized below.

FIG. 10 is a table showing an example of a control message format used in NB-IoT relating to the NPDCCH. More specifically, table 1000 shows an example of <NPDCCH order=0, N1 CRC masked with RA-RNTI>.

DCI Format N1

DCI format N1 is used for the scheduling of one NPDSCH codeword per TTI in one cell, random access procedure initiated by a NPDCCH order, notifying Single Cell Multicast Control Channel (SC-MCCH) change, and operation on preconfigured UL resources. The DCI corresponding to a NPDCCH order is carried by NPDCCH.

The following information is transmitted by means of the DCI format N1:

- If the format N1 CRC is scrambled by a Cell Radio Network Temporary Identifier (C-RNTI) or RA-RNTI or Preconfigured Uplink Resource Radio Network Temporary Identifier (PUR-RNTI):
  - Flag for format NO/format N1 differentiation—1 bit, where value 0 indicates format N0 and value 1 indicates format N1
  - NPDCCH order indicator—1 bit
- Else if the format N1 CRC is scrambled by a Group Radio Network Temporary Identifier (G-RNTI):
  - Information for SC-MCCH change notification—may be 2 bits Format N1 is used for random access procedure initiated by a NPDCCH order only if NPDCCH order indicator is set to '1', format N1 CRC is scrambled with C-RNTI, and all the remaining fields are set as follows:

- Preamble format indicator—1 bit, where value 0 indicates preamble format 0/1 and value 1 indicates preamble format 2. This field is only present if nprach-ParametersListFmt2 is configured and the UE 802 indicates the nprach-Format2 capability.
- Starting number of NPRACH repetitions—2 bits
- Subcarrier indication of NPRACH—6 or 8 bits, this field is 8 bits only if Preamble format indicator is present and set to 1
- Carrier indication of NPRACH—4 bits. This field is only present if ul-ConfigList is configured and the UE indicates the multiCarrier-NPRACH capability.
- All the remaining bits in format N1 are set to one
- Otherwise:
- Scheduling delay—3 bits
- Resource assignment—3 bits
- Modulation and coding scheme—4 bits. If npdsch-16QAM-Config is configured and the value is '1111', it functions as 16QAM indicator.
- Repetition number—4 bits. If 16 QAM is indicated, it functions as Modulation and coding scheme for 16QAM.
- New data indicator—1 bit. If multiple transport blocks (TB) are scheduled, it functions as New data indicator for the first TB.
- Hybrid Automatic Repeat Request Acknowledgement (HARQ-ACK) resource—4 bits.
- DCI subframe repetition number—2 bits
- Number of scheduled TB for Single Cell Multicast Transport Channel (SC-MTCH)—3 bits, indicating from 1 to 8 TBs. This field is only present if higher layer parameter sc-mtch-InfoListMultiTB-r16 is enabled and the CRC of the DCI is scrambled by G-RNTI.
- Number of scheduled TB for Unicast—1 bit, where value 0 indicates a single TB is scheduled and value 1 indicates multiple TB are scheduled. This field is only present if higher layer parameter npdsch-MultiTB-Config is enabled and the corresponding DCI is mapped onto the UE specific search space given by the C-RNTI
- HARQ process number—1 bit. This field is only present if 2 HARQ processes are configured and the corresponding DCI format is mapped onto the UE specific search space given by the C-RNTI, or if Number of scheduled TB for Unicast is present. If multiple TB are scheduled, it functions as New data indicator for the second TB.
- Resource reservation—1 bit. This field is only present if higher layer parameter resourceReservationConfigDL is configured and the DCI is mapped onto the UE-specific search space given by C-RNTI.

When the format N1 CRC is scrambled with a RA-RNTI or a G-RNTI, then the following fields among the fields above are reserved for RA-RNTI and not present for G-RNTI:

- New data indicator
- HARQ-ACK resource

If the number of information bits in format N1 mapped onto the same search space is less than that of format N0 and the format N1 CRC is not scrambled by G-RNTI, zeros shall be appended to format N1 until the payload size equals that of format N0.

As shown in FIG. 10, there are a total of 5 reserved bits available for DCI format N1 for RAR scheduling. These bits may be used to indicate the OCC index when OCC multiplexing is supported for NPRACH preamble transmissions. The number of bits required depends on the configured OCC multiplexing method and the OCC multiplexing factors. Since there are a total of 5 reserved bits available, the maximum number of multiplexing with OCC is limited to 32. The specification may support a smaller maximum number of multiplexing factors, e.g. 8 or 16. In this case, not all reserved bits are used.

If Method 1 intra repetition OCC multiplexing only is configured, OCC is applied among the random access symbol groups in a repetition. The total number of symbol groups in a preamble repetition unit is denoted by P. The multiplexing capability of intra repetition multiplexing is determined by the value P, e.g. maximum spreading factor of 4 OCC for the 4 access symbol groups in a repetition for preamble format 0 and format 1. Thus, only two bits are required to indicate the OCC index. For preamble format 2 with P=6, 3 bits may be required to indicate the OCC index if the multiplexing factor is configured as 6.

If Method 2 inter repetition OCC multiplexing only is configured, OCC is applied among the preamble repetitions. If Method 3 OCC multiplexing on symbol groups within and across repetitions, type 3 OCC is required, OCC is applied among the random access symbol groups in one or more repetitions. For both cases, the number of bits required is determined by the configured multiplexing factor, e.g. 2 bits are required for OCC multiplexing of 4, 3 bits are required for OCC multiplexing of 8, 4 bits are required for OCC multiplexing of 16, and all 5 bits are required for OCC multiplexing of 32.

If Method 4 is configured with a combination of intra repetition and inter repetition OCC, the number of bits required is determined by the configured intra repetition and inter repetition multiplexing factors.

If Approach 1 is applied, both intra repetition OCC and inter repetition OCC are performed. Intra repetition OCC is applied first on symbol groups in a repetition, and inter repetition OCC is applied over the repetitions with intra repetition OCC. Two bits are required to indicate the intra repetition OCC index if intra repetition multiplexing factor 4 is applied. And the remaining 3 bits may be used to indicate the inter repetition OCC index for the inter repetition multiplexing. Thus, the maximum number of inter repetition multiplexing factor should be 8, which will result in a combined multiplexing factor of 32 with both the intra repetition OCC and inter repetition OCC. Thus, the reserved bits are divided into two fields, 2 bits for intra repetition OCC index, and 3 bits for inter repetition OCC index.

Alternatively, a single OCC index is determined for both the intra repetition OCC and inter repetition OCC. Thus, only one field is defined for the OCC index.

In one example, the overall OCC index (OCC_id) is calculated as:

$$\text{OCC\_id} = \text{inter repetition } OCC \text{ index} * \text{intra repetition } OCC \text{ multiplexing factor} + \text{intra repetition } OCC \text{ index}.$$

In another example, the overall OCC index (OCC_id) is calculated as:

$$\text{OCC\_id} = \text{intra repetition } OCC \text{ index} * \text{inter repetition } OCC \text{ multiplexing factor} + \text{inter repetition } OCC \text{ index}.$$

If Approach 2 is applied, the inter repetition OCC overrides the intra repetition OCC. Thus, if inter repetition OCC multiplexing is configured, intra repetition OCC multiplexing is disabled even if it is configured. This approach will be the same as Method 2 above, and the number of bits required is determined by the configured multiplexing factor, e.g. 2 bits are required for OCC multiplexing of 4, 3 bits are required for OCC multiplexing of 8, 4 bits are required for OCC multiplexing of 16, and all 5 bits are required for OCC multiplexing of 32.

With this solution (Solution 1), the RA-RNTI is not changed. The UEs that send the preambles in the same NPRACH resource will derive the same RA-RNTI, and can receive and decode the NPDCCH DCI format N1. The UE with the same OCC index as indicated in the DCI format N1 will know that the DCI is targeted for itself, and will receive and decode the NPDSCH for RAR based on the DCI indication. Another UE(s) with different OCC index(es) on the same NPRACH resource will have the same RA-RNTI, and can decode the DCI format N1 and find out that the indicated OCC index is different, and will not receive and decode the scheduled NPDSCH for the RAR.

Considerations with Solution 1:

The legacy UEs without OCC support will not recognize, and may ignore the new fields in the NPDCCH, because the fields are treated as reserved. Thus, if a legacy UE also sends NPRACH in the given resource, it will not differentiate the OCC index. Thus, both UEs may decode the RAR NPDCCH and the corresponding NPDSCH, and collision may occur in Msg 3 transmissions from the legacy UE and the UE with the indicated OCC since they will send NPUSCH in the same resource indicated in the RAR. However, this may not be a serious issue, the legacy UE is equivalent of using an OCC index 0, and the corresponding NPDCCH and NPDSCH are needed anyway. The gNB may need to schedule different NPDCCH and NPDSCH for RAR for different UEs with different OCC indexes.

Solution 2: Apply Different RA-RNTI Numbers for Different OCC Indexes

For NB-IoT UEs, the RA-RNTI associated with the PRACH in which the Random Access Preamble is transmitted, is described above. To differentiate different OCC indexes on the same NPRACH resource, different RA-RNTI may be used for different OCC indexes. For example, additional offset values can be included in the RA-RNTI formula. The offsets should be selected so that the result will not collide with RA-RNTI from other PRACH resources.

In one implementation, the offset value for an OCC index (OCC_id) may be evenly distributed into 256 values based on the OCC multiplexing factor (OCC_factor), i.e. offset_step=256/OCC_factor, offset=offset_step*OCC_id.

Thus, for NB-IoT UEs, the RA-RNTI associated with the PRACH in which the Random Access Preamble is transmitted with an OCC index of OCC_id and OCC multiplexing factor of OCC_factor, is computed as:

$$RA\text{-}RNTI = 1 + \text{floor}(\text{SFN\_id}/4) + 256 * \text{carrier\_id} + 256/\text{OCC\_factor} * \text{OCC\_id}$$

Where SFN_id is the index of the first radio frame of the specified PRACH and carrier_id is the index of the UL carrier associated with the specified PRACH. The carrier_id of the anchor carrier is 0.

For NB-IoT UEs operating in TDD mode, the RA-RNTI associated with the PRACH in which the Random Access Preamble is transmitted, is computed as:

$$RA\text{-}RNTI = 1 + \text{floor}(\text{SFN\_id}/4) + 256 * (H - SFN \bmod 2) + 256/\text{OCC\_factor} * \text{OCC\_id}$$

Where SFN_id is the index of the first radio frame of the specified PRACH and Hyper System Frame Number (H-SFN) is the index of the first hyper frame of the specified PRACH. The PDCCH transmission and the PRACH resource are on the same carrier.

In another implementation, to avoid RA-RNTI collision, the offset values are calculated above all configured carriers. Given the number of carriers, i.e. numberOfCarriers, for frequency division duplexing (FDD), the RA-RNTI can be calculated as:

$$RA\text{-}RNTI = 1 + \text{floor}(\text{SFN\_id}/4) + 256 * numberOfCarriers + 256 * \text{OCC\_id}$$

And for TDD the RA-RNTI can be calculated as:

$$RA\text{-}RNTI = 1 + \text{floor}(\text{SFN\_id}/4) + 256 * (H\text{-}SFN \bmod 2) + 256 * \text{OCC\_id}$$

In case both intra repetition OCC and inter repetition OCC are applied, a single overall OCC index may be determined for the RA-RNTI calculation.

In one example, the overall OCC index (OCC_id) is calculated as:

$$\text{OCC\_id} = \text{inter repetition } OCC \text{ index} * \text{intra repetition } OCC \text{ multiplexing factor} + \text{intra repetition } OCC \text{ index}.$$

In another example, the overall OCC index (OCC_id) is calculated as:

$$\text{OCC\_id} = \text{intra repetition } OCC \text{ index} * \text{inter repetition } OCC \text{ multiplexing factor} + \text{inter repetition } OCC \text{ index}.$$

With this solution (Solution 2), the DCI format N1 is not changed for the RAR. The UEs that send the preambles with different OCC indexes will derive different RA-RNTIs for DCI format N1 reception. Only the UE sending the preambles with the same OCC index can verify the CRC by the derived RA-RNTI in the NPDCCH DCI format N1, and will receive and decode the NPDSCH for RAR based on the DCI indication. The other UEs with different OCC index on the same NPRACH resource will have different RA-RNTIs, and cannot decode the DCI format N1 scrambled with the RA-RNTI with the indicated OCC index, and will not receive and decode the scheduled NPDSCH for the RAR either.

Thus, Solution 2 can avoid the ambiguity of RAR detection, thus preventing Msg 3 collision from UEs using different OCC indexes in the NPRACHs. However, the RA-RNTI formula is modified with OCC indexes, and there is a potential RNTI collision issue. The collision issue may be avoided to make sure the RA-RNTI is limited to a specific range of RNTI values.

Solution 3: Apply Different Scrambling Sequences for Different OCC Indexes.

Yet in another solution, different OCC indexes may be differentiated by applying different NPDCCH scrambling sequences. The current scrambling sequence is determined as specified below.

Additional offset values based on the OCC indexes can be included in calculating the NPDCCH scrambling sequences. Scrambling reinitialization can be recalculated based on OCC index.

Scrambling

The scrambling sequence shall be initialized at the start of subframe $k_0$ and after every $4^{th}$ NPDCCH subframe with $$c_{init} = \lfloor n_s/2 \rfloor 2^9 + N_{ID}^{Ncell}$$

where $n_s$ is the first slot of the NPDCCH subframe in which scrambling is (re-)initialized.

Pdcch Multiplexing and Scrambling

The block of bits $$b^{(i)}(0), \ldots, b^{(i)}(M_{bit}^{(i)} - 1)$$

on each of the control channels to be transmitted in a subframe, where $$M_{bit}^{(i)}$$

is the number of bits in one subframe to be transmitted on physical downlink control channel number i, shall be multiplexed, resulting in a block of bits $$b^{(0)}(0), \ldots, b^{(0)}(M_{bit}^{(0)} - 1), b^{(1)}(0), \ldots, b^{(1)}(M_{bit}^{(1)} - 1), \ldots, b^{(n_{PDCCH}-1)}(0), \ldots, b^{(n_{PDCCH}-1)}\left(M_{bit}^{(n_{PDCCH}-1)} - 1\right),$$

where $n_{PDCCH}$ is the number of PDCCHs transmitted in the subframe.

The block of bits $$b^{(0)}(0), \ldots, b^{(0)}(M_{bit}^{(0)} - 1), b^{(1)}(0), \ldots, b^{(1)}(M_{bit}^{(1)} - 1), \ldots, b^{(n_{PDCCH}-1)}(0), \ldots, b^{(n_{PDCCH}-1)}\left(M_{bit}^{(n_{PDCCH}-1)} - 1\right)$$

shall be scrambled with a cell-specific sequence prior to modulation, resulting in a block of scrambled bits $\tilde{b}(0), \ldots \tilde{b}(M_{tot}-1)$ according to $$\tilde{b}(i) = (b(i) + c(i)) \bmod 2$$

The scrambling sequence is c(i). The scrambling sequence generator shall be initialized with $$c_{init} = \lfloor n_s/2 \rfloor 2^9 + N_{ID}^{cell}$$

at the start of each subframe.

CCE number n corresponds to bits b(72n), b(72n+1), . . . , b(72n+71). If necessary, <NIL> elements shall be inserted in the block of bits prior to scrambling to ensure that the PDCCHs starts at the CCE positions and to ensure that the length $$M_{tot} = 8N_{REG} \geq \sum_{i=0}^{n_{PDCCH}-1} M_{bit}^{(i)}$$

of the scrambled block of bits matches the amount of resource-element groups not assigned to PCFICH or PHICH.

Pseudo-Random Sequence Generation

Pseudo-random sequences are defined by a length-31 Gold sequence. The output sequence c(n) of length $M_{PN}$, where n=0, 1, . . . , $M_{PN}$−1, is defined by $$c(n) = (x_1(n + N_c) + x_2(n + N_c))\bmod 2$$

$$x_1(n + 31) = (x_1(n + 3) + x_1(n))\bmod 2$$

$$x_2(n + 31) = (x_2(n + 3) + x_2(n + 2) + x_2(n + 1) + x_2(n))\bmod 2$$

Where $N_C$=1600 and the first m-sequence shall be initialized with $x_1(0)=1$, $x_1(n)=0$, n=1, 2, . . . , 30. The initialization of the second m-sequence is denoted by $$c_{init} = \sum_{i=0}^{30} x_2(i) \cdot 2^i$$

with the value depending on the application of the sequence.

Solution 4: Include the OCC Index in the RAR

Yet in another solution, instead of indicating the NPRACH OCC index in the NPDCCH for RAR NPDSCH, the OCC index may be included in the RAR NPDSCH content.

Mac Payload for Random Access Response

The MAC RAR is of fixed size and consists of the following fields:

- R: Reserved bit, set to "0". For a BL UE or a UE in CE, this bit is set to "1" to indicate that an UL Grant in Random Access Response is for EDT.
- Timing Advance Command: The Timing Advance Command field indicates the index value $T_A$ (0, 1, 2 . . . 1282) used to control the amount of timing adjustment that the MAC entity has to apply, except for NB-IoT UEs using preamble format 2, where the Timing Advance Command field indicates the index value $T_A$ (0, 1, 2 . . . 1536). The size of the Timing Advance Command field is 11 bits.
- UL Grant: The Uplink Grant field indicates the resources to be used on the uplink. The size of the UL Grant field is 20 bits, except for NB-IoT UEs, where the size of UL grant field is 15 bits, and except for BL UEs and UEs in enhanced coverage level 2 or 3, where the size of the UL grant field is 12 bits.
- ER: Extended RAPID bits, indicating the two least significant bits of extended RAPID used when PRACH preamble format 2 is transmitted.
- Temporary C-RNTI: The Temporary C-RNTI field indicates the temporary identity that is used by the MAC entity during Random Access. The size of the Temporary C-RNTI field is 16 bits.

The MAC RAR is octet aligned.

The RAR payload size should be fixed. Thus, some unused or reserved bits can be borrowed to indicate the OCC index of the NPRACH preamble. For example, when NPRACH preamble format 0 and 1 is used, the 2 ER bits can be used to indicated the OCC index, at least for OCC multiplexing capability up to 4.

Enb Behaviors for NPRACH and Msg 2 RAR Transmission with PRACH OCC Multiplexing

With the support of OCC multiplexing on NPRACH preambles, the eNB 804 should transmit NPRACH configurations including NPRACH resource configuration, repetition parameters, and orthogonal cover code (OCC) multiplexing methods and OCC multiplexing factors, etc. This can be done in SIB2 together with legacy NPRACH configuration with new parameters and/or fields.

The eNB 804 detects and receives NPRACH preambles on NPRACH resources with the configured OCC multiplexing method(s) and multiplexing factor(s). The eNB 804 may determine the NPRACH index and the OCC index for the received NPRACH preambles.

After the detection of NPRACH preambles with the NPRACH index and OCC index, the eNB 804 determines the RA-RNTI used for the NPDCCH scheduling the RAR, and transmits a NPDCCH DCI format N1 with CRC scrambled by the RA-RNTI for RAR in the RA response window after the reception of the NPRACH preambles with OCC multiplexing; and transmits a NPDSCH for RAR scheduled by the NPDCCH with DCI format N1 for RAR.

In one solution, the eNB 804 may indicate the determined OCC index by one or more OCC index fields using the reserved bits in NPDCCH DCI format N1 for RAR. In case of both intra repetition OCC and inter repetition OCC are applied, separate OCC index fields can be used for intra repetition OCC and inter repetition OCC respectively. Alternatively, a single OCC index field can be used to indicate a joint OCC index, which can be calculated based on the intra repetition OCC index and inter repetition OCC index.

In another solution, the eNB 804 may indicate the OCC index implicitly by the RA-RNTI. Thus, for the NPDCCH CRC scrambling, the RA-RNTI value is calculated based on a defined formula with offset value for the determined OCC index.

Yet in another solution, the eNB 804 may determine a scrambling sequence for the NPDCCH for RAR by the determined OCC index.

Yet in another solution, the eNB 804 may indicate the OCC index in the MAC RAR content using some reserved bits.

Nb-IoT UE Behaviors for Msg 2 Detection with NPRACH OCC Multiplexing

The IoT NTN device receives NPRACH configurations including NPRACH resource configuration, repetition parameters, and orthogonal cover code (OCC) multiplexing methods and OCC multiplexing factors, etc. In random access procedure, the device selects a NPRACH resource, randomly selects an OCC index for an OCC multiplexing, and transmits NPRACH preambles with the configured OCC multiplexing method(s) and multiplexing factor(s).

The device receives a NPDCCH DCI format N1 and CRC scrambled by a RA-RNTI for RAR in the RA response window after the transmission of NPRACH preambles with the configured OCC multiplexing. The device then determines the OCC index indicated in the NPDCCH or the RAR, and compares the determined OCC index with the selected OCC index in the NPRACH preamble transmissions with OCC multiplexing.

In one method, the OCC index is determined by one or more OCC index fields using the reserved bits in NPDCCH DCI format N1 for RAR.

In another solution, the OCC index is determined by the RA-RNTI value based on a defined formula with offset values for the OCC indexes. The OCC index is the same if the received NPDCCH is scrambled with the RA-RNTI derived by the selected OCC index in the NPRACH preamble transmissions with OCC multiplexing.

Yet in another solution, the OCC index is determined by the scrambling and (re)initialization sequences for the NPDCCH with different sequences corresponding to different OCC indexes.

Yet in another solution, the OCC index is indicated in the MAC RAR content using some reserved bits.

If the determined OCC index is the same as the selected OCC index in the NPRACH preamble transmissions with OCC multiplexing, the NPDCCH is for the device. The device receives the NPDSCH for RAR as scheduled by the NPDCCH.

Otherwise, if the determined OCC index is not the same as the selected OCC index in the NPRACH preamble transmissions with OCC multiplexing, the NPDCCH is not for the device. The device does not receive and does not decode the NPDSCH for RAR scheduled by the NPDCCH.

Figure 11:
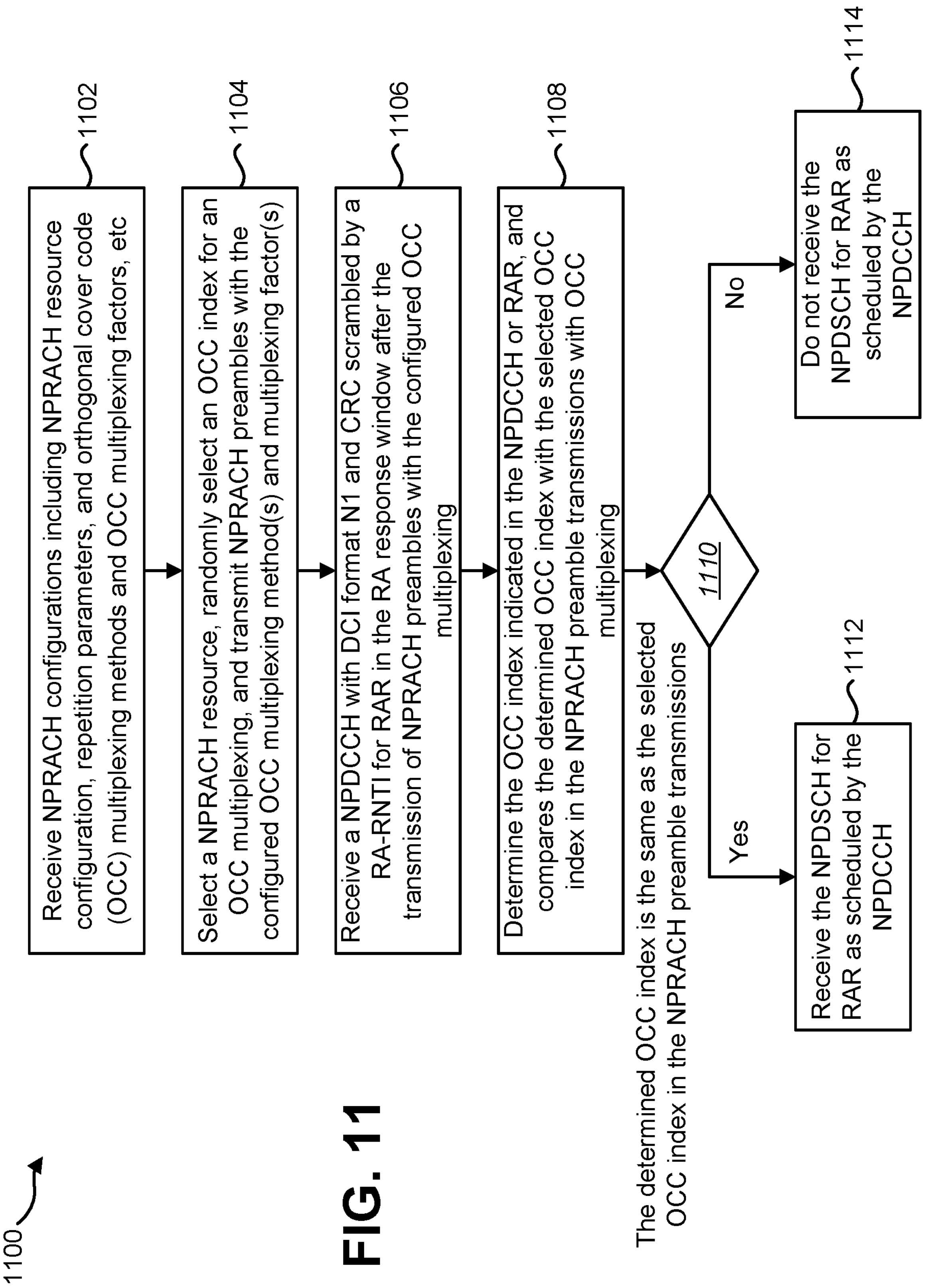
FIG. 11 is a flow diagram illustrating an example of a method by a UE.

FIG. 11 is a flow diagram illustrating one example of a method 1100 by a UE 802. The UE may receive 1102 NPRACH configurations including NPRACH resource configuration, repetition parameters, and orthogonal cover code (OCC) multiplexing methods and OCC multiplexing factors, etc. The UE may select 1104 a NPRACH resource, randomly select an OCC index for an OCC multiplexing, and transmit NPRACH preambles with the configured OCC multiplexing method(s) and multiplexing factor(s). The UE may receive 1106 a NPDCCH with DCI format N1 and CRC scrambled by a RA-RNTI for RAR in the RA response window after the transmission of NPRACH preambles with the configured OCC multiplexing. The UE may determine 1108 the OCC index indicated in the NPDCCH or RAR, and compares the determined OCC index with the selected OCC index in the NPRACH preamble transmissions with OCC multiplexing. The UE may also determine 1110 whether the determined OCC index is the same as the selected OCC index in the NPRACH preamble transmissions. If it is the same, the UE may receive 1112 the NPDSCH for RAR as scheduled by the NPDCCH. If it is not the same, the UE does not receive 1114 the NPDSCH for RAR as scheduled by the NPDCCH.

Random Access Msg 3 NPUSCH Transmission for NPRACH with OCC

In the Solutions above, the gNB needs to send separate NPDCCH and NPDSCH for RAR of each IoT NTN device with a different OCC index. Thus, multiple NPDCCHs and NPDSCHs are needed to respond to IoT devices with different OCC indexes using the same NPRACH resource. Thus, a RAR is explicitly scheduled for each detected NPRACH preamble with an OCC index. And the NPUSCH resource for Msg is explicitly scheduled by the RAR Msg2. Also, the solutions above need some changes in the NPDCCH DCI format or the RA-RNTI determination formula, etc., as well as additional UE and gNB behaviors for OCC detection and indication.

Thus, the NTN gNB and satellite can schedule separate NPDCCH and NPDSCH independently even if they use the same frequency/time domain resources. The collision resolution can be solved by scheduling different NPUSCH resources for different UEs, i.e. the content in the RAR NPDSCH should be different.

Considering the beams for NTN DL transmissions, if two UEs are under different DL beams, they cannot receive the message to the other UE. However, the gNB may not be able to identify the actual beam from a NPRACH transmission. Thus, the gNB may need to send the RARs to all beams. If a NPRACH resource is associated with a beam group and/or a beam pattern, the gNB may need to send RARs to all the beams in the beam group and/or beam pattern. If different OCC indexes are detected on the same NPRACH resource, multiple RARs corresponding to different OCC indexes may need to be transmitted on all beams. This will incur significant overhead and resource utilization.

To simplify the procedure, the NPDCCH and NPDSCH for RAR may be kept without changes. Additional behaviors can be specified to determine the NPDSCH resource in Msg 2 RAR and/or the NPUSCH resource for Msg3 to differentiate different PRACH OCC indexes.

With this principle, the Msg2 RAR procedure is not changed. When NPRACH preamble(s) with OCC multiplexing is/are received on a NPRACH time/frequency resource, a NPDCCH scrambled with RA-RNTI is used to schedule the NPDSCH for RAR. The RA-RNTI is determined by the NPRACH resource index as in the legacy system. The MAC RAR in the NPDSCH content includes a UL grant for Msg 3 transmission and a Temporary C-RNTI. The UL grant and temporary cell radio network temporary identifier (TC-RNTI) can be determined based on no NPRACH OCC multiplexing or NPRACH OCC index 0.

The UEs that transmit NPRACH with different OCC indexes in the same NPRACH resource, will receive and decode the same RAR Msg2, including NPDCCH and NPDSCH. In current RACH procedure, the UEs will transmit the Msg3 NPUSCH with the same indicated resource, thus cause collusion of Msg3.

The key issue in RACH procedure is the collision resolution. Thus, new methods may be specified for NPRACH with OCC to avoid potential Msg3 collision for UEs transmitting NPRACH with different OCC indexes on the same NPRACH resource.

Approach 1: A Different Msg 3 NPUSCH Resource Location is Used for UE that Transits NPRACH with a Different OCC Index For collision resolution, a different Msg3 NPUSCH resource may be used for a different OCC index, i.e. for NPRACH preambles with OCC support, a rule may be specified or configured so that different Msg 3 NPUSCH resources for different OCC indexes.

In one example, the Msg3 NPUSCH resource is determined by an offset value. The offset value may be fixed in the standard. The offset value may be determined by the scheduled NPUSCH resource. The UL grant in the RAR for NB-IoY has a fixed 15 bits, and includes a subcarrier spacing field, a subcarrier indication field for resource assignment, a modulation and coding scheme, a delay and repetition number etc., as shown in the specification section below.

Narrowband Random Access Response Grant

The higher layers indicate the Nr-bit UL Grant to the physical layer. This is referred to as the Narrowband Random Access Response Grant in the physical layer.

Nr-bit=15, and the content of these 15 bits starting with the MSB and ending with the LSB are as follows:

- Uplink subcarrier spacing $\Delta f$ is '0'=3.75 kHz or '1'=15 kHz—1 bit
- Subcarrier indication field $I_{sc}$–6 bits
- Scheduling delay field ($I_{Delay}$) with $k_0$=12 for $I_{Delay}$=0, where NB-IoT DL subframe n is the last subframe in which the NPDSCH associated with the Narrowband Random Access Response Grant is transmitted—2 bits
- Msg3 repetition number $N_{Rep}$—3 bits
- Menu Control Switch (MCS) index indicating TBS, modulation, and number of RUs for Msg3—3 bits The redundancy version for the first transmission of Msg3 is 0.

If the UE is not using higher layer parameter edt-Parameters, or the UE is using higher layer parameter edt-parameters and $0 \leq I_{MCS} \leq 2$, the TBS, modulation, and number of RUs for Msg3 are determined according to FIG. 12

Otherwise, if the UE is configured with higher layer parameter edt-SmallTBS-Enabled set to 'false', the TBS is given by higher layer parameter edt-TBS Otherwise, the UE selects a TBS from the allowed TBS values according to FIG. 13 the repetition number for Msg3 is the smallest integer multiple of L value that is equal to or larger than $TBS_{Msg3}/TBS_{Msg3,max} \cdot N_{Rep}$ where $TBS_{Msg3}$ is the selected TBS for Msg3, and $TBS_{Msg3,max}$ is given by higher layer parameter edt-TBS f $\Delta f$=15 kHz and $I_{sc}>11$ and $N_{Rep} \geq 8$, then L=4 otherwise L=1 is used the number of RUs for Msg3 are determined according to FIG. 14

π/4 QPSK modulation is used for $\Delta f$=3.75 kHz and for $\Delta f$=15 kHz with $I_{sc}$=0, 1, . . . , 11; QPSK modulation is used for $\Delta f$=15 kHz with $I_{sc}>11$ FIG. 12 is a table 1200 showing an example of MCS index for Msg3 NPUSCH. More specifically, the table shows Modulation and Coding Scheme (MCS) indices for Msg3 NPUSCH. Columns for the MCS index, the modulation type, the number of resource units (RUs), and the Transport Block Size (TBS) are shown.

FIG. 13 is a table 1300 showing an example of configuration parameters for the transmission of Msg3 on NPUSCH with a focus on eDT-TBS (enhanced Data Transmission—Transport Block Size) values when the feature "edt-Small-TBS-Enabled" is set to "true". The column for edt-TBS represents the specific Transport Block Size (TBS) that could be used for the enhanced Data Transmission (eDT). The edt-SmallTBS-Subset indicates whether a smaller subset of TBS values is configured for use. Allowable TBS values may be TBS values that are permissible for use when sending Msg3 on NPUSCH.

FIG. 14 is a table 1400 showing an example of MCS index for Msg3 NPUSCH and EDT. Table 1400 provides a mapping between the MCS index and the number of Resource Units (RUs) required for different sizes of eDT-TBS on NPUSCH and EDT for Msg3 transmissions. Table 1400 may be used to determine the resource allocation for uplink transmissions in NB-IoT systems, specifically for Msg3, which is a message typically sent by the UE as part of the initial access process to the network.

Resource Allocation

The resource allocation information in uplink DCI format N0 for NPUSCH transmission or configured by higher layers for NPUSCH transmission using preconfigured uplink resource indicates to a scheduled UE:

a set of contiguously allocated subcarriers ($n_{sc}$) of a resource unit determined by the Subcarrier indication field, or by the higher layer parameter npusch-SubCarrierSetIndex in PUR-Config-NB a number of resource units ($N_{RU}$) determined by the resource assignment field according to FIG. 15, or by the higher layer parameter npusch-NumRUsIndex in PUR-Config-NB a repetition number ($N_{Rep}$) determined by the repetition number field according to FIG. 17, and for a NPUSCH transmission using preconfigured uplink resource, the UE shall use the repetition number configured by higher layers; except for NPUSCH with 16QAM where $N_{Rep}$=1.

The subcarrier spacing $\Delta f$ of NPUSCH transmission is determined by:

the higher layer parameter npusch-SubCarrierSetIndex, in the case of NPUSCH transmission using preconfigured uplink resources and subsequent NPUSCH transmissions until a Narrowband Random Access Response Grant is received.

the uplink subcarrier spacing field in the Narrowband Random Access Response Grant.

For NPUSCH transmission with subcarrier spacing $\Delta f$=3.75 kHz, $n_{sc}=I_{sc}$ where $I_{sc}$ is the subcarrier indication field and $I_{sc}$=48, 49, . . . , 63 is reserved, or $n_{sc}$ is configured by higher layers parameter npusch-SubCarrierSetIndex in PUR-Config-NB for NPUSCH transmissions using preconfigured uplink resources.

For NPUSCH transmission with subcarrier spacing $\Delta f$=15 kHz, the subcarrier indication field ($I_{sc}$) in the DCI or npusch-SubCarrierSetIndex in PUR-Config-NB for NPUSCH transmissions using preconfigured uplink resources determines the set of contiguously allocated subcarriers ($n_{sc}$) according to FIG. 15.

FIG. 15 is a table 1500 showing an example of allocated subcarriers for NPUSCH with $\Delta f$=15 kHz. Table 1500 outlines the allocation of subcarriers for the NPUSCH when the frequency spacing ($\Delta f$) is 15 kHz. Table 1500 shows how the subcarrier indication field $I_{sc}$ corresponds to specific sets of allocated subcarriers for the NPUSCH.

FIG. 16 is a table 1600 showing an example of number of resource units (NRU) for NPUSCH. Table 1600 shows the correlation between the index of resource units ($I_{RU}$) and the number of resource units (NRU) for the NPUSCH. The table provides a simple lookup between the index value and the corresponding number of resource units.

FIG. 17 is a table 1700 showing an example of number of repetitions ($N_{Rep}$) for NPUSCH. Table 1700 illustrates the relationship between an index value ($I_{Rep}$) and the corresponding number of repetitions ($N_{Rep}$) for transmissions on the NPUSCH.

The indicated NPUSCH resource for Msg 3 can be scheduled based on legacy RAR without OCC, the same as OCC index 0 with OCC. The subcarrier indication $I_{sc}$ determines the starting subcarrier index for the NPUSCH resource, the number of subcarriers in the RU configuration, the number of slots in a RU, etc. Thus, the $I_{sc}$ indication maps to the NPUSCH format as shown in FIG. 18.

FIG. 18 is a diagram 1800 showing examples of tables of subcarrier indication field mappings to sets of allocated subcarriers and of NPUSCH format configurations. The upper table illustrates how the subcarrier indication field ($I_{sc}$) is mapped to sets of allocated subcarriers ($n_{sc}$) for NPUSCH. The lower table illustrates the NPUSCH format configurations, including the frequency spacing $\Delta f$ (3.75 kHz or 15 kHz), the number of resource units per subcarrier, and the number of uplink slots and symbols associated with each format.

The NPUSCH resource for an OCC index value k can then be determined with a different starting subcarrier index based on the indicated NPUSCH resource. The number of subcarriers in the RU $$N_{sc}^{RU}$$

is determined by the subcarrier indication. Assuming the scheduled starting subcarrier index is n for no OCC or OCC index 0, the NPUSCH starting subcarrier index with an OCC index value k is then determined by $$n + kN_{sc}^{RU}.$$

That is, the offset step size is determined by $$N_{sc}^{RU}$$

based on the indication. All the other parameters are the same for NPUSCH resources for different OCC indexes. To avoid subcarrier indexes out of the allocated carrier bandwidth, modular function should be applied, thus, the starting subcarrier index for OCC index k is determined by $$(n + kN_{sc}^{RU})\mathrm{mod}(Nsc),$$

where Nsc is the total number of subcarriers for the NB-IoT UL carrier.

Since the gNB detects the OCC indexes in the NPRACH, the gNB should make sure the indicated NPUSCH resource is valid for the intended OCC indexes. This is reasonable especially for IoT NTN devices since the satellite links have very long distances. When the multiplexing capability is not very high, e.g. only supporting a multiplexing factor of 4, the gNB should be able to ensure that the NPUSCH resources for the intended OCC index k is available and won't conflict with other scheduled transmissions.

Figure 19:
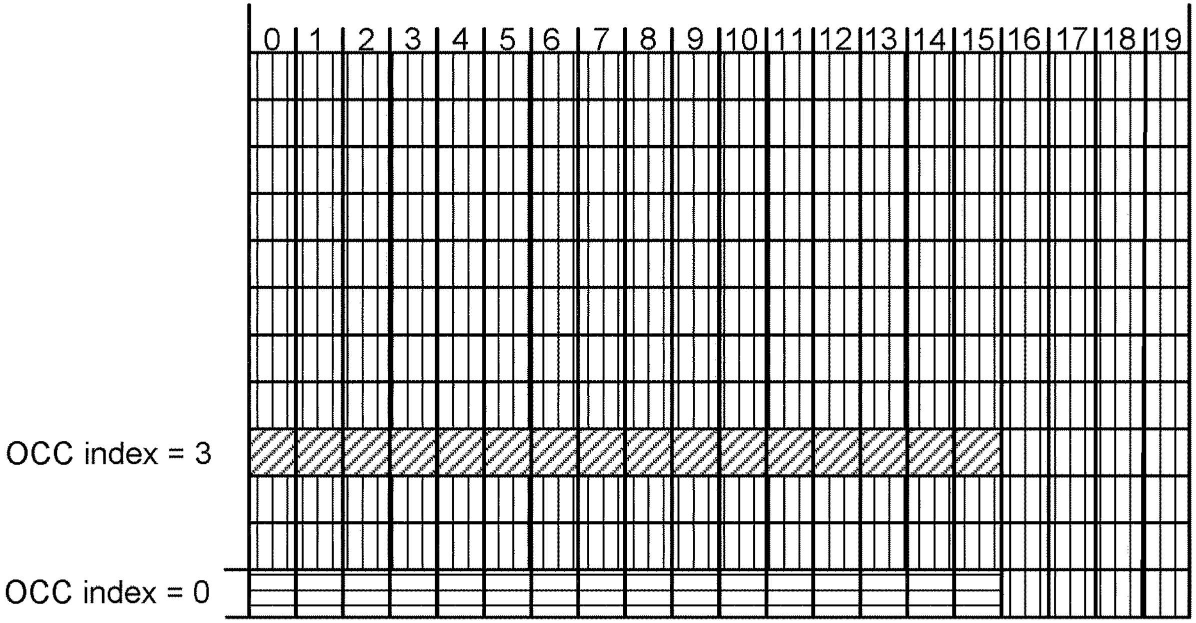
FIG. 19 is a diagram showing an example of NPUSCH format configurations for NB-IoT with different frequency spacings alongside a graphical representation of Orthogonal Cover Codes (OCC) application.

FIG. 19 is a diagram 1900 showing an example of NPUSCH format configurations for NB-IoT with different frequency spacings alongside a graphical representation of Orthogonal Cover Codes (OCC) application. The diagram 1900 shows an example assuming the RAR indicates the resource with OCC index 3. In this example, the NPUSCH format 1 with $$N_{sc}^{RU} = 1$$

and a RU includes 16 slots, each slot has 7 symbols. For a UE transmitted NPRACH with OCC index 3, the UE will determine the NPUSCH resource for Msg 3 with offset values based on the OCC index. If there are two UEs that transmitted NPRACH preambles with OCC index 0 and OCC index 3 respectively in the same NPRACH time and frequency resource, they will transmit Msg 3 separately on different NPUSCH resources. Thus, no Msg 3 collision will occur, and RACH procedure can be completed.

With this method, there is no additional specification change on the DCI formats and RAR transmissions. Also, a single DCI can schedule multiple NPUSCH transmissions from multiple UEs with different OCC indexes.

Approach 2: An OCC Index is Applied on the NPUSCH for Msg 3 for UE that Transmits NPRACH with OCC In another approach, IoT NTN devices that support OCC for NPRACH preambles, should also support OCC for NPUSCH. In this case, the UE may apply an OCC index on the Msg3 NPUSCH, and the same OCC index as in the NPRACH preambles can be used for the NPUSCH transmissions.

For NPUSCH with OCC multiplexing, the gNB can detect the NPUSCH from multiple UEs if different OCC indexes are used for the NPUSCH transmission.

With NPUSCH OCC multiplexing support, a UE with a given OCC index in NPRACH preamble will use the same OCC index in the NPUSCH for Msg 3. The gNB already detects the OCC index(es) in NPRACH preamble, and knows which OCC index(es) should be monitored for reception. The Msg3 reception with the same OCC index can also be used as a confirmation of NPRACH detection and collision resolution.

The range of OCC indexes for the Msg NPUSCH may be configured or limited, e.g. only N=4 OCC indexes can be used. If the OCC indexes for PRACH is larger than support OCC capabilities for NPUSCH, a modular function for NPUSCH OCC index can be used, i.e. OCC index for NPUSCH=(OCC index for NPRACH) mod N, where N is the number of OCC indexes supported for Msg 3 NPUSCH.

In a rare case, if two or more UEs send NPRACH with the same OCC index in the same NPRACH resource, collision may still occur to end the RACH process. In this case, the gNB may not be able to correctly detect the NPRACH with the given OCC, thus no corresponding RAR is transmitted. If the gNB issues an RAR, the UEs will transmit Msg3 on the same NPUSCH resource based on the OCC index, and cause a Msg 3 collision. Since the content of Msg 3 is different from different UEs, most likely the gNB cannot decode any of them.

Compared with legacy RACH procedure without OCC, the collision can be avoided if the UEs are using different OCC indexes in the NPRACH transmissions. Collision occurs only if two or more UEs send NPRACH preambles on the same NPRACH resource and the same OCC index.

In the RAR, a temporary C-RNTI is included together with timing advance and UL grant. For both Approach 1 and Approach 2, the same TC-RNTI can be used for Msg 3 from UEs with different NPRACH OCC indexes. Additionally, or alternatively, to further separate the UEs with different OCC indexes in Msg 3 reception, different TC-RNTI can be applied for different OCC indexes, e.g. TC-RNTI for OCC index k=indicated TC-RNTI+k.

The selection of Approach 1 and Approach 2 may be determined by gNB indication. For example, the support of NPUSCH OCC multiplexing can be indicated separately in SIB2, or the indication of NPRACH OCC support also indicates the OCC support for Msg3 NPUSCH. If Msg3 OCC support is indicated, Approach 2 is used for Msg 3 transmission. Otherwise, Approach 1 is used, so that the Msg3 NPUSCH resource is determined jointly by the UL grant and the OCC index.

Approach 3: Indicate Multiple UL Grants with OCC Index in a RAR

Yet in another approach, the Msg 2 RAR NPDSCH may include UL grants for multiple OCC indexes. The UL resource for each indicated OCC index can be explicitly scheduled. Same NPDCCH format to indicate the NPDSCH location. The RAR MAC packet may need to be extended to include a field for OCC index, and one or more UL grant blocks can be included in the RAR.

Alternatively, the gNB can indicate the selection between Msg 3 multiplexing or explicit OCC indication in Msg 2 NPDCCH and/or RAR. If Msg 3 multiplexing is not supported, the solutions for explicit OCC index indication in the Msg 2 NPDCCH and/or RAR should be performed. If Msg 3 multiplexing is supported, Msg3 NPUSCH OCC multiplexing or implicit NPRACH resource determination based on OCC index should be performed.

The gNB and UE behaviors with the Msg3 multiplexing based on OCC index are summarized below.

eNB Behaviors with PRACH OCC Multiplexing and RAR with NPUSCH Resource Indication With the support of OCC multiplexing on NPRACH preambles, the eNB 804 should transmit NPRACH configurations including NPRACH resource configuration, repetition parameters, and orthogonal cover code (OCC) multiplexing methods and OCC multiplexing factors, etc. This can be done in SIB2 together with legacy NPRACH configuration with new parameters and/or fields.

The eNB 804 detects and receives NPRACH preambles on NPRACH resources with the configured OCC multiplexing method(s) and multiplexing factor(s). The eNB 804 may determine the NPRACH index and the OCC index for the received NPRACH preambles.

After the detection of NPRACH preambles with the NPRACH index and OCC index, the eNB 804 determines the RA-RNTI used for the NPDCCH scheduling the RAR, and transmits a NPDCCH DCI format N1 with CRC scrambled by the RA-RNTI for RAR in the RA response window after the reception of the NPRACH preambles with OCC multiplexing; and transmits a NPDSCH for RAR scheduled by the NPDCCH with DCI format N1 for RAR.

The gNB then receives the Msg3 PUSCH transmission(s) on the scheduled NPUSCH resource indicated in the RAR from the UE. The NPUSCH resource for a UE with a NPRACH OCC index is determined by the UL resource indication in the RAR and the NPRACH OCC index value. Alternatively, the NPUSCH is transmitted using OCC multiplexing with the detected NPRACH preamble OCC index.

NB-IoT UE Behaviors with PRACH OCC Multiplexing and RAR with NPUSCH Resource Indication The IoT NTN device receives NPRACH configurations including NPRACH resource configuration, repetition parameters, and orthogonal cover code (OCC) multiplexing methods and OCC multiplexing factors, etc. In random access procedure, the device selects a NPRACH resource, randomly selects an OCC index for an OCC multiplexing, and transmits NPRACH preambles with the configured OCC multiplexing method(s) and multiplexing factor(s).

The device receives a NPDCCH DCI format N1 and CRC scrambled by a RA-RNTI for RAR in the RA response window after the transmission of NPRACH preambles with the configured OCC multiplexing. The RAR includes the UL grant for Msg3 from the UE.

The UE then determines the NPUSCH resource for Msg3 based on the UL grant information in the RAR and the NPRACH OCC index.

Assuming the scheduled starting subcarrier index is n in the RAR indication, the NPUSCH starting subcarrier index with an OCC index value k is then determined by an offset step size of $$N_{sc}^{RU}$$

based on the subcarrier indication.

Alternatively, the UE transmits NPUSCH on the indicated UL grant resource using OCC multiplexing with the same OCC index as the NPRACH preamble OCC index.

The UE then transmits a Msg3 NPUSCH on the determined NPUSCH resource.

Figure 20:
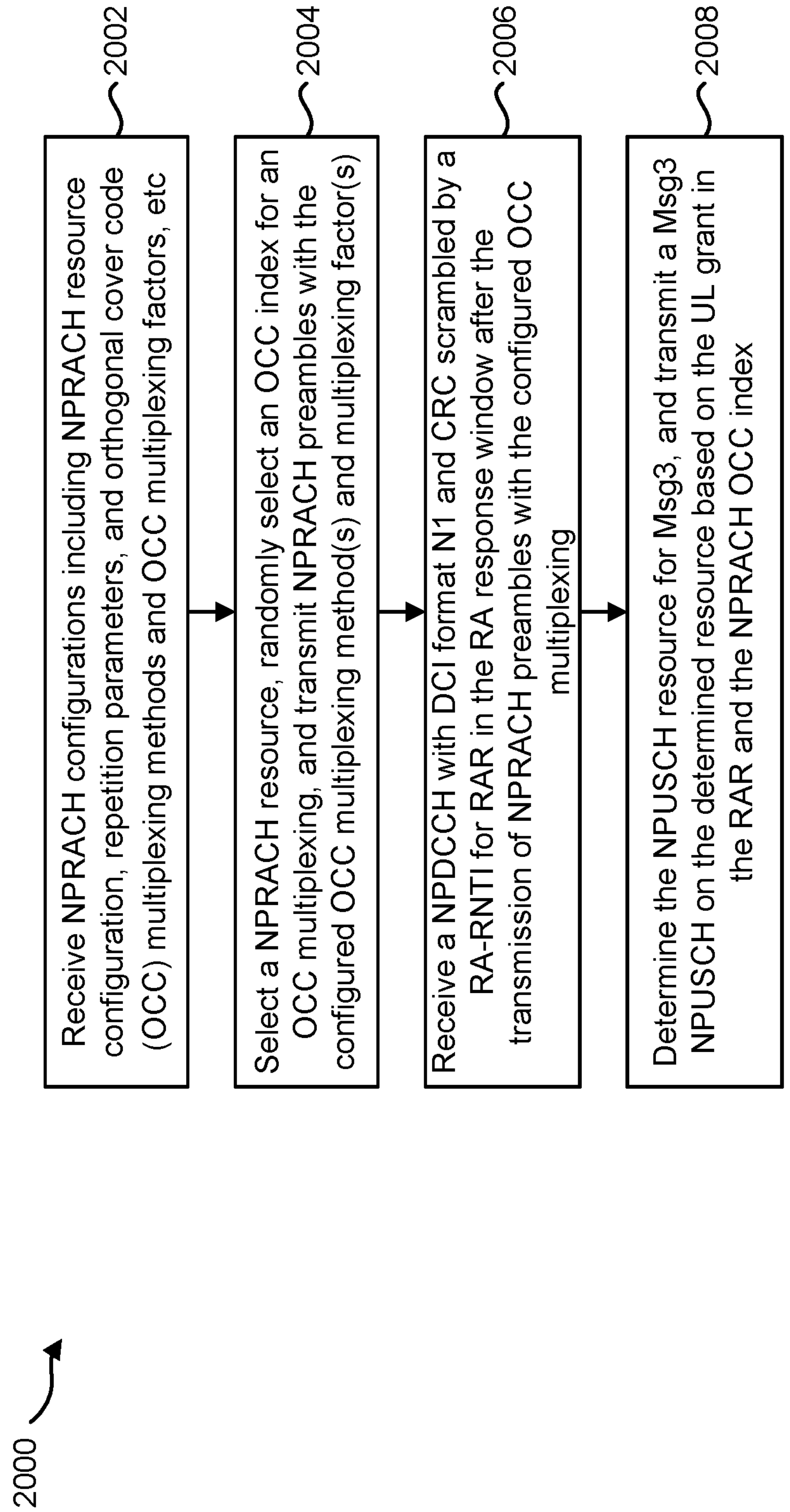
FIG. 20 is a flow diagram illustrating an example of a method by a UE.

FIG. 20 is a flow diagram illustrating one example of a method 2000 by a UE. The UE may receive 2002 NPRACH configurations including NPRACH resource configuration, repetition parameters, and orthogonal cover code (OCC) multiplexing methods and OCC multiplexing factors, etc. The UE may select 2004 a NPRACH resource, randomly select an OCC index for an OCC multiplexing, and transmit NPRACH preambles with the configured OCC multiplexing method(s) and multiplexing factor(s). The UE may receive 2006 a NPDCCH with DCI format N1 and CRC scrambled by a RA-RNTI for RAR in the RA response window after the transmission of NPRACH preambles with the configured OCC multiplexing. The UE may determine 2008 the NPUSCH resource for Msg3, and transmit a Msg3 NPUSCH on the determined resource based on the UL grant in the RAR and the NPRACH OCC index.

Figure 21:
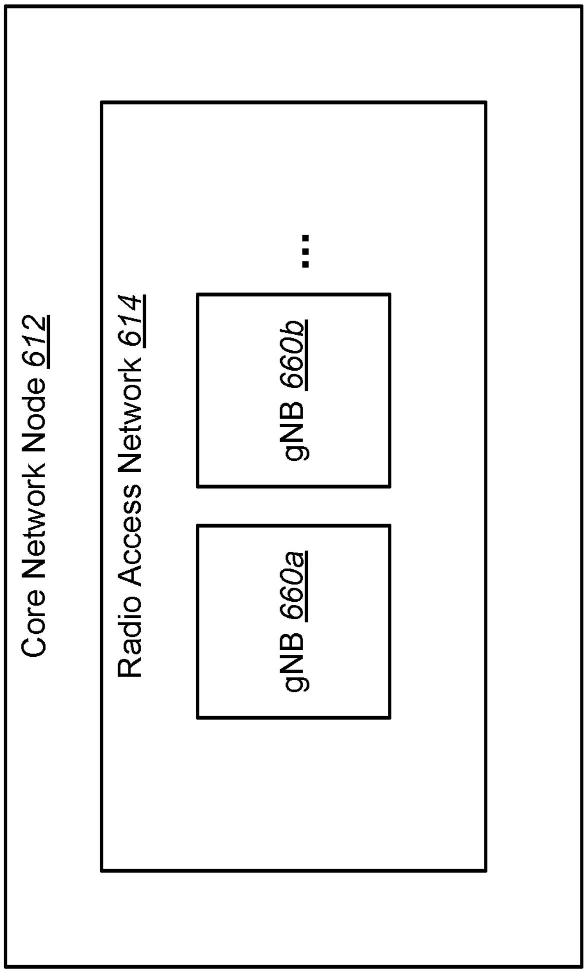
FIG. 21 is a diagram illustrating one implementation of a core network node.

FIG. 21 is block diagram illustrating one implementation of a core network node 612. The core network node 612 may include a radio access network 614 that includes a plurality of gNBs (gNB 660*a*, 660*b*). Messages transmitted and received by the core network node 612 may be transmitted and received by the gNBs 660*a*, 660*b* in the radio access network 614. The core network node 612 may be part of the 5GC 118 or the NG-RAN 102.

Figure 22:
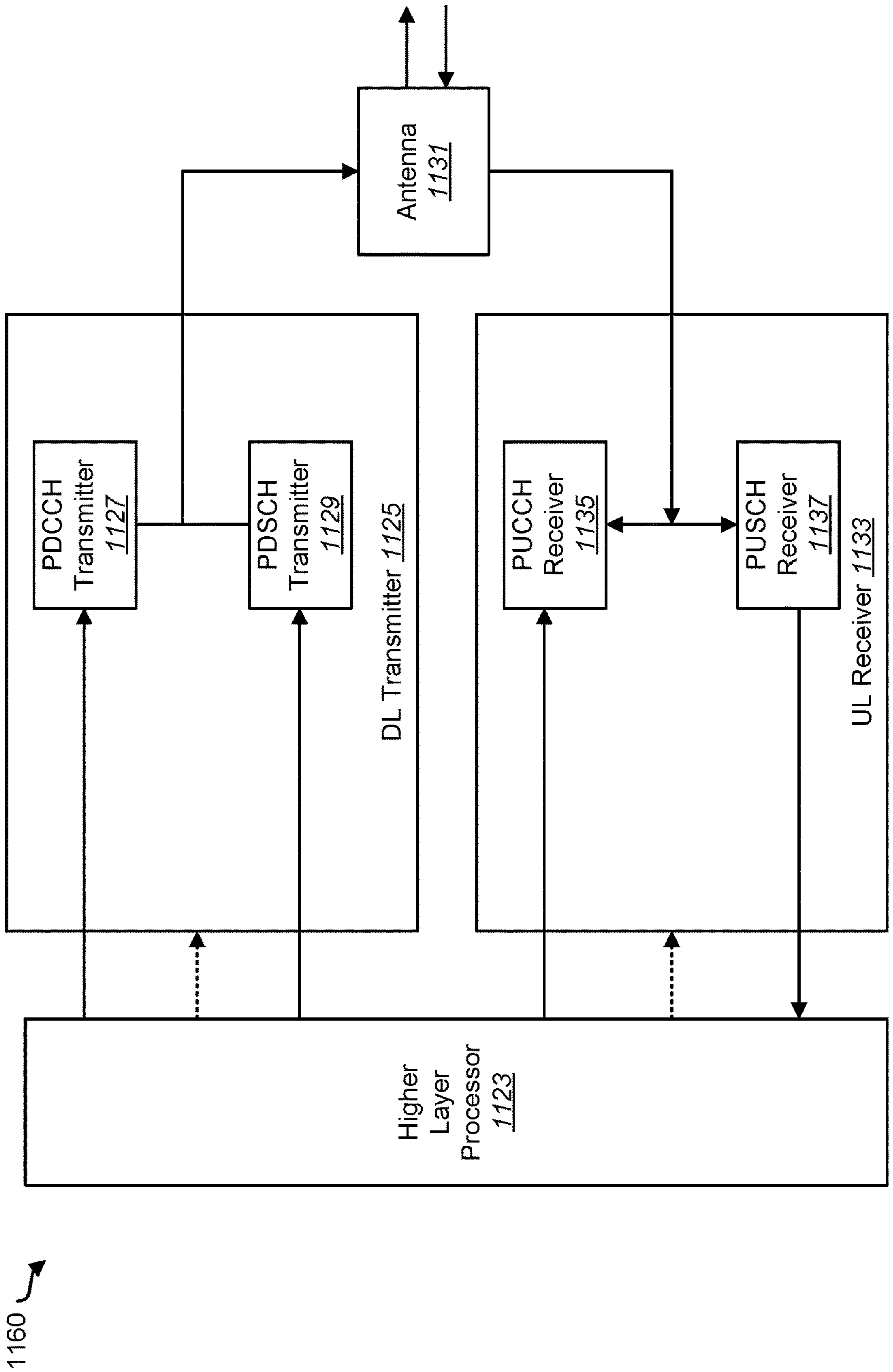
FIG. 22 is a block diagram illustrating one implementation of a base station (gNB) in which the present systems and methods may be implemented.

FIG. 22 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a wireless terminal's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 Uplink Control Information (UCI). The PUSCH receiver 1137 may provide the higher layer processor 1123 received transport blocks.

Figure 23:
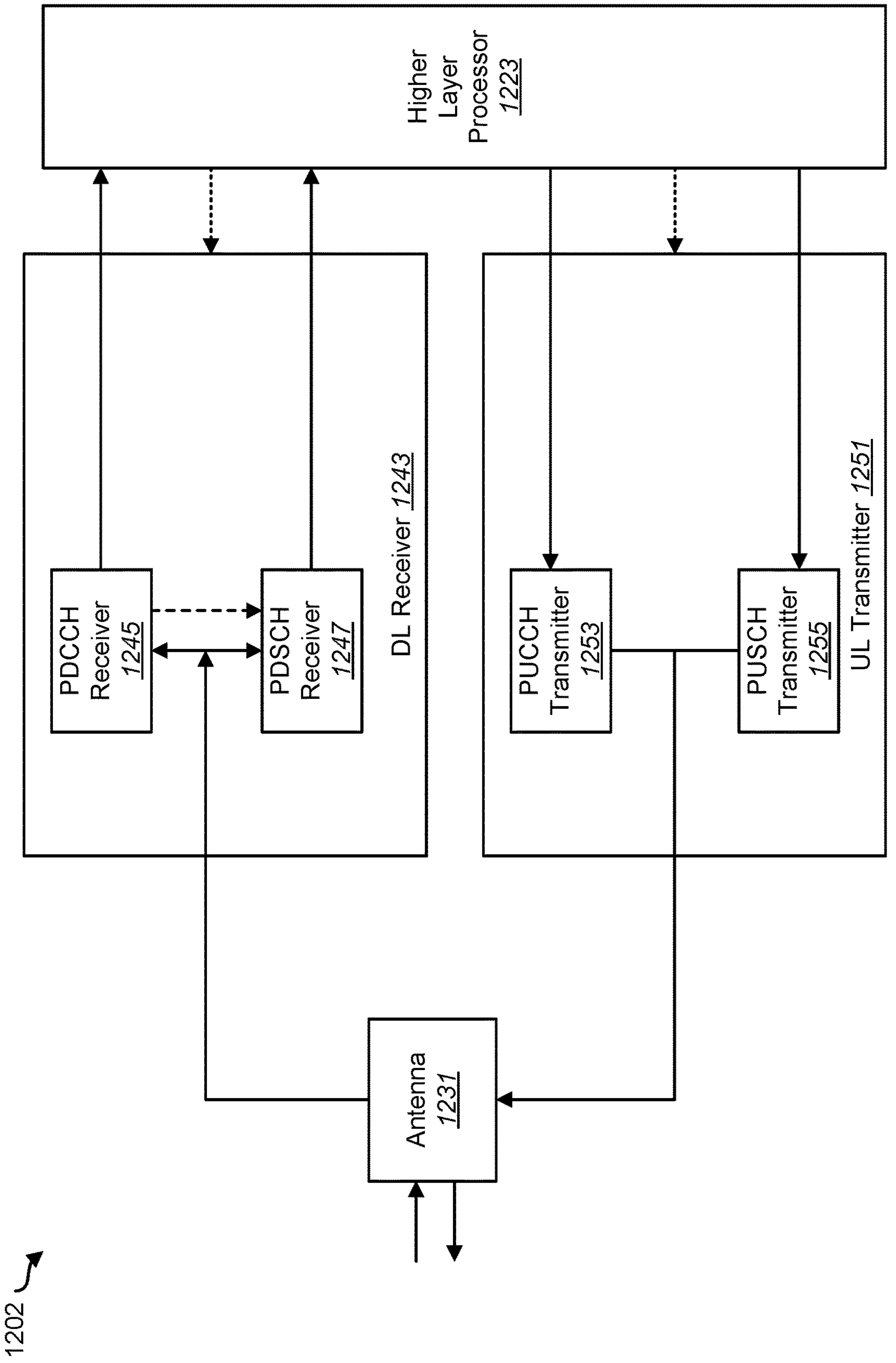
FIG. 23 is a block diagram illustrating one implementation of a wireless terminal in which the present systems and methods may be implemented.

FIG. 23 is a block diagram illustrating one implementation of a wireless terminal 1202. In some examples, the wireless terminal 1202 is a UE. The wireless terminal 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a wireless terminal's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI (Downlink Control Information). The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 24:
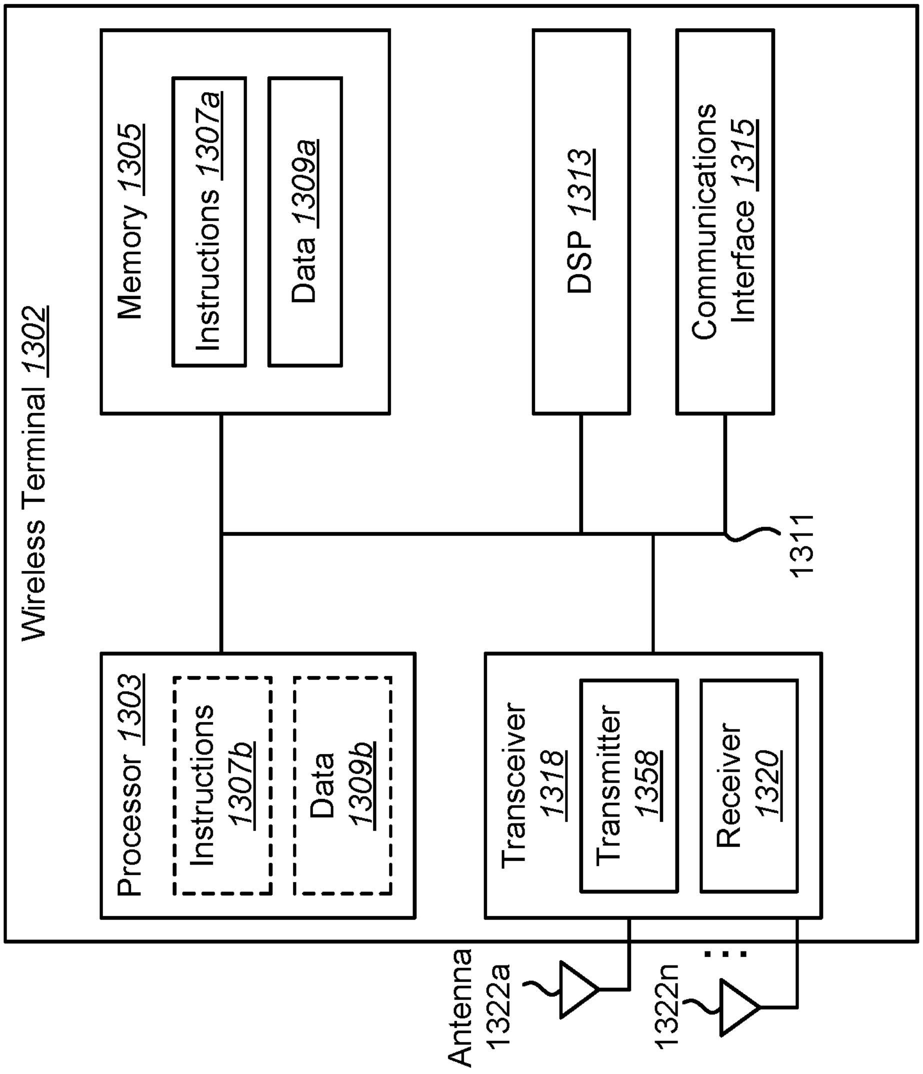
FIG. 24 illustrates various components that may be utilized in a wireless terminal in which the present systems and methods may be implemented.

FIG. 24 illustrates various components that may be utilized in a wireless terminal 1302. In some examples, the wireless terminal 1302 is a UE. The wireless terminal 1302 described in connection with FIG. 24 may be implemented in accordance with the wireless terminal described herein. The wireless terminal 1302 includes a processor 1303 that controls operation of the wireless terminal 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random-access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The wireless terminal 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the wireless terminal 1302 are coupled together by a bus system 1311, which may include a power bus, a control signal bus and a status signal bus, in addition to a data bus. However, for the sake of clarity, the various buses are illustrated in FIG. 24 as the bus system 1311. The wireless terminal 1302 may also include a digital signal processor (DSP) 1313 for use in processing signals. The wireless terminal 1302 may also include a communications interface 1315 that provides user access to the functions of the wireless terminal 1302. The wireless terminal 1302 illustrated in FIG. 24 is a functional block diagram rather than a listing of specific components.

Figure 25:
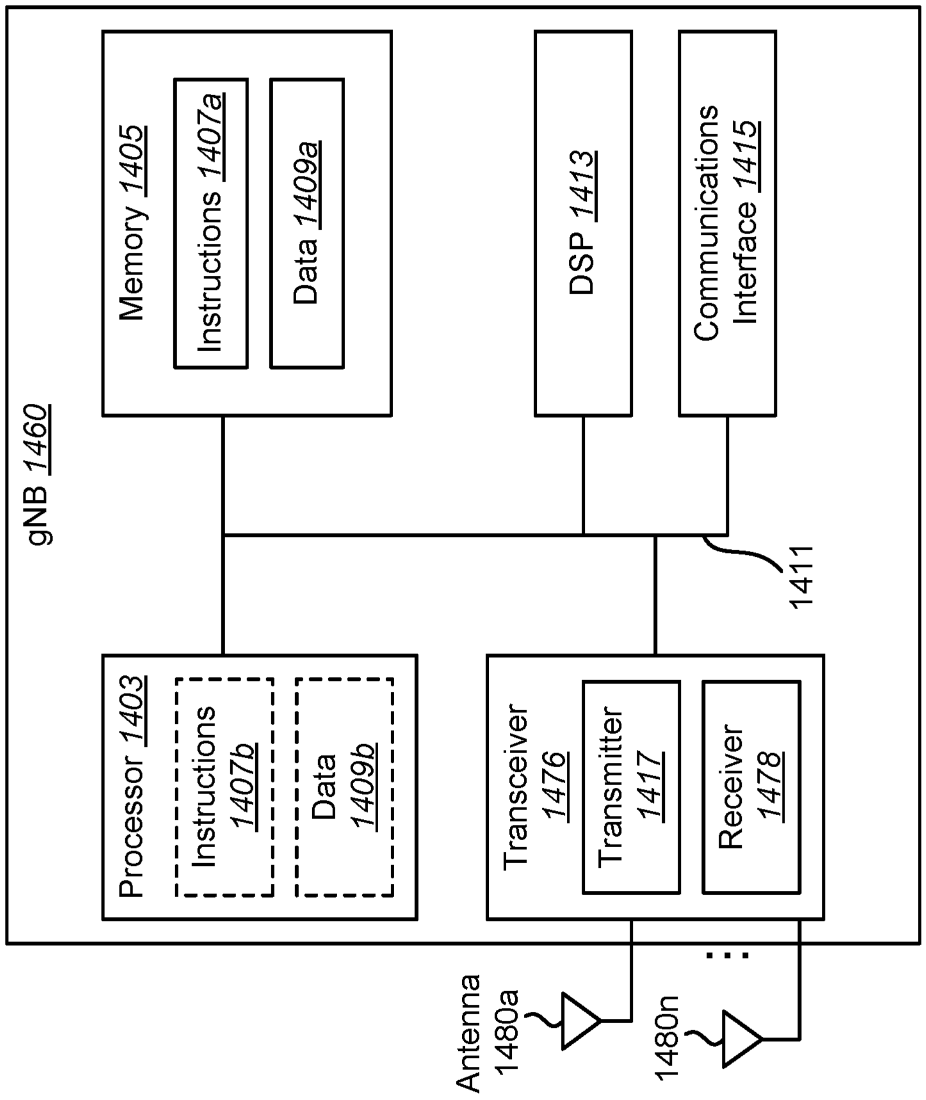
FIG. 25 illustrates various components that may be utilized in a gNB in which the present systems and methods may be implemented.

FIG. 25 illustrates various components that may be utilized in a gNB 1460. The gNB 1460 described in connection with FIG. 24 may be implemented in accordance with the gNB described herein. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random-access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 25 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 25 is a functional block diagram rather than a listing of specific components.

Figure 26:
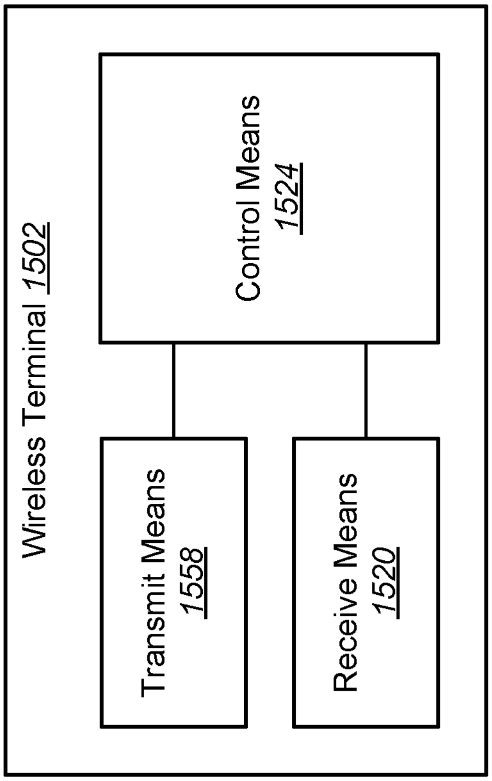
FIG. 26 is a block diagram illustrating one implementation of a wireless terminal in which the present systems and methods may be implemented.

FIG. 26 is a block diagram illustrating one implementation of a wireless terminal 1502 in which systems and methods for resource allocations of enhanced uplink transmissions may be implemented. The wireless terminal 1502 includes transmit means 1558, receive means 1520 and control means 1524. The transmit means 1558, receive means 1520 and control means 1524 may be configured to perform one or more of the functions described herein. FIG. 24 above illustrates one example of a concrete apparatus structure of FIG. 26. Other various structures may be implemented to realize one or more of the functions herein. For example, a DSP may be realized by software.

Figure 27:
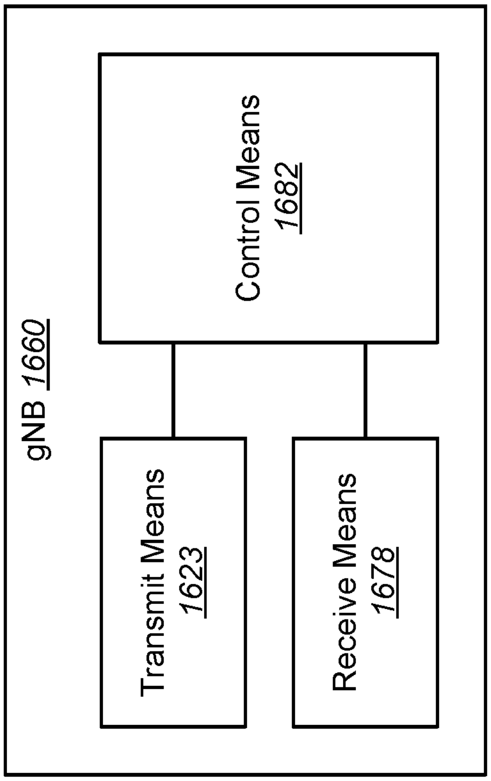
FIG. 27 is a block diagram illustrating one implementation of a gNB in which the present systems and methods may be implemented.

FIG. 27 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described herein. FIG. 25 above illustrates one example of a concrete apparatus structure of FIG. 27. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB or the wireless terminal according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or Hard Disk Drives (HDDs), and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB and the wireless terminal according to the systems and methods described above may be realized as an LSI that is a typical integrated circuit. Each functional block of the gNB and the wireless terminal may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. An internet of things (IoT) non-terrestrial network (NTN) device user equipment (UE), comprising:
- receiving circuitry configured to:
  - receive narrowband physical random access channel (NPRACH) configurations including NPRACH resource configuration, repetition parameters, orthogonal cover code (OCC) multiplexing methods and OCC multiplexing factors;
  - receive a narrowband physical downlink control channel (NPDCCH) downlink control information (DCI) format N1 and cyclic redundancy check (CRC) scrambled by a random access-radio network temporary identifier (RA-RNTI) for random access response (RAR) in an RA response window after transmission of NPRACH preambles with the configured OCC multiplexing;
  - determine an OCC index indicated in the NPDCCH or the RAR, and compare the determined OCC index with a selected OCC index in the NPRACH preamble transmissions with OCC multiplexing;
- transmitting circuitry configured to:
  - select an NPRACH resource, randomly select an OCC index for an OCC multiplexing; and
  - transmit NPRACH preambles with a configured OCC multiplexing method and a multiplexing factor.

2. The UE of claim 1, wherein the OCC index is determined by one or more OCC index fields using reserved bits in NPDCCH DCI format N1 for RAR.

3. The UE of claim 1, wherein the OCC index is determined by an RA-RNTI value based on a defined formula with offset values for the OCC indexes, wherein the OCC index is the same if the received NPDCCH is scrambled with the RA-RNTI derived by the selected OCC index in the NPRACH preamble transmissions with OCC multiplexing.

4. The UE of claim 1, wherein the OCC index is determined by a scrambling sequence applied to the NPDCCH.

5. The UE of claim 1, wherein the OCC index is indicated in medium access control (MAC) RAR content using reserved bits.

6. The UE of claim 1, wherein if the determined OCC index is the same as the selected OCC index in the NPRACH preamble transmissions with OCC multiplexing, then receive the narrowband physical downlink shared channel (NPDSCH) for RAR as scheduled by the NPDCCH.

7. The UE of claim 1, wherein if the determined OCC index is not the same as the selected OCC index in the NPRACH preamble transmissions with OCC multiplexing, then do not receive the narrowband physical downlink shared channel (NPDSCH) for RAR scheduled by the NPDCCH.

8. A base station (gNB), comprising:

transmitting circuitry configured to:

transmit narrowband physical random access channel (NPRACH) configurations including NPRACH resource configuration, repetition parameters, orthogonal cover code (OCC) multiplexing methods and OCC multiplexing factors;

transmit a narrowband physical downlink control channel (NPDCCH) downlink control information (DCI) format N1 with cyclic redundancy check (CRC) scrambled by a random access-radio network temporary identifier (RA-RNTI) for random access response (RAR) in an RA response window after reception of NPRACH preambles with OCC multiplexing;

transmit a narrowband physical downlink shared channel (NPDSCH) for RAR scheduled by the NPDCCH with DCI format N1 for RAR;

receiving circuitry configured to:

receive and detect NPRACH preambles on NPRACH resources with a configured OCC multiplexing method and a multiplexing factor; and determine an NPRACH index and an OCC index for the received NPRACH preambles.

9. The gNB of claim 8, wherein the determined OCC index is indicated by one or more OCC index fields using reserved bits in NPDCCH DCI format N1 for RAR.

10. The gNB of claim 8, wherein for the NPDCCH CRC scrambling, an RA-RNTI value is calculated based on a defined formula with an offset value for the determined OCC index.

11. The gNB of claim 8, wherein a scrambling sequence for the NPDCCH for RAR is determined by the determined OCC index.

12. The gNB of claim 8, wherein the OCC index is indicated in medium access control (MAC) RAR content using reserved bits.

13. A method by an internet of things (IoT) non-terrestrial network (NTN) device user equipment (UE), comprising:

receiving narrowband physical random access channel (NPRACH) configurations including NPRACH resource configuration, repetition parameters, orthogonal cover code (OCC) multiplexing methods and OCC multiplexing factors;

receiving a narrowband physical downlink control channel (NPDCCH) downlink control information (DCI) format N1 and cyclic redundancy check (CRC) scrambled by a random access-radio network temporary identifier (RA-RNTI) for random access response (RAR) in an RA response window after transmission of NPRACH preambles with the configured OCC multiplexing;

determining an OCC index indicated in the NPDCCH or the RAR, and comparing the determined OCC index with a selected OCC index in the NPRACH preamble transmissions with OCC multiplexing;

selecting an NPRACH resource and randomly selecting an OCC index for an OCC multiplexing; and transmitting NPRACH preambles with a configured OCC multiplexing method and a multiplexing factor.

* * * * *